(12) United States Patent
Shotton et al.

(10) Patent No.: US 9,053,571 B2
(45) Date of Patent: Jun. 9, 2015

(54) GENERATING COMPUTER MODELS OF 3D OBJECTS

(75) Inventors: Jamie Daniel Joseph Shotton, Cambridge (GB); Shahram Izadi, Cambridge (GB); Otmar Hilliges, Cambridge (GB); David Kim, Cambridge (GB); David Molyneaux, Oldham (GB); Pushmeet Kohli, Cambridge (GB); Andrew Fitzgibbon, Cambridge (GB); Stephen Edward Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 13/154,288

(22) Filed: Jun. 6, 2011

(65) Prior Publication Data
US 2012/0306876 A1 Dec. 6, 2012

(51) Int. Cl.
*G06T 17/00* (2006.01)
*G06T 15/00* (2011.01)
*G06T 17/10* (2006.01)
*G06T 7/20* (2006.01)

(52) U.S. Cl.
CPC .............. *G06T 17/10* (2013.01); *G06T 2200/08* (2013.01); *G06T 7/2046* (2013.01); *G06T 2207/10028* (2013.01)

(58) Field of Classification Search
CPC combination set(s) only.
See application file for complete search history.

(56) References Cited

U.S. PATENT DOCUMENTS

| | | | |
|---|---|---|---|
| 5,930,392 A | 7/1999 | Ho | |
| 6,603,880 B2 | 8/2003 | Sakamoto | |
| 7,327,362 B2 | 2/2008 | Grau | |
| 7,855,732 B2 | 12/2010 | Williams et al. | |
| 2002/0043632 A1 | 4/2002 | Miramonti et al. | |
| 2002/0112024 A1 | 8/2002 | Yang et al. | |
| 2008/0310677 A1 | 12/2008 | Weismuller et al. | |
| 2009/0244309 A1* | 10/2009 | Maison et al. | 348/222.1 |

(Continued)

OTHER PUBLICATIONS

Haqiqat, Payman., "Using Image Moments for Tracking Rotating Objects", Retrieved at <<http://www.icgst.com/ARAS05/papers/P1130533112.pdf>>, ARAS Conference, Dec. 19-21, 2005, pp. 38-43.

(Continued)

*Primary Examiner* — Jeffrey Chow
*Assistant Examiner* — Leon T Cain, II
(74) *Attorney, Agent, or Firm* — Gregg Wisdom; Judy Yee; Micky Minhas

(57) ABSTRACT

Generating computer models of 3D objects is described. In one example, depth images of an object captured by a substantially static depth camera are used to generate the model, which is stored in a memory device in a three-dimensional volume. Portions of the depth image determined to relate to the background are removed to leave a foreground depth image. The position and orientation of the object in the foreground depth image is tracked by comparison to a preceding depth image, and the foreground depth image is integrated into the volume by using the position and orientation to determine where to add data derived from the foreground depth image into the volume. In examples, the object is hand-rotated by a user before the depth camera. Hands that occlude the object are integrated out of the model as they do not move in sync with the object due to re-gripping.

20 Claims, 14 Drawing Sheets

(56) References Cited

U.S. PATENT DOCUMENTS

| | | | |
|---|---|---|---|
| 2009/0290811 A1* | 11/2009 | Imai | 382/285 |
| 2010/0278384 A1 | 11/2010 | Shotton et al. | |
| 2012/0194516 A1 | 8/2012 | Newcombe et al. | |
| 2012/0194517 A1 | 8/2012 | Izadi et al. | |
| 2012/0196679 A1 | 8/2012 | Newcombe et al. | |

OTHER PUBLICATIONS

Shin, et al., "Occlusion removal technique for improved recognition of partially occluded 3D objects in computational integral imaging", Retrieved at <<http://www.google.co.in/url?sa=t&source=web&cd==3&ved=0CCkQFjAC&url=http%3A%2F%2Fciteseerx.ist.psu.edu%2Fviewdoc%2Fdownload%3Fdoi%3D10.1.1.141.2928%26rep%3Drep1%26type%3Dpdf&rct=j&q=3d%20object%20detection%20model%20occlusion%20removal&ei=geVQTbVByb SEB7y5wKkJ&usg=AFQjCNHCuW2cLyX33gO-iRcCLETFCaT CnQ>>, 2008, pp. 4589-4597.

"Three-Dimensional Environment Reconstruction", U.S. Appl. No. 13/017,690, filed Jan. 31, 2011, pp. 1-31.

"Reducing Interference Between Multiple Infra-Red Depth Cameras", U.S. Appl. No. 13/017,518, filed Jan. 31, 2011, pp. 1-25.

"Mobile Camera Localization Using Depth Maps", U.S. Appl. No. 13/017,474, filed Jan. 31, 2011, pp. 1-36.

"Real-Time Camera Tracking Using Depth Maps", U.S. Appl. No. 13/017,587, filed Jan. 31, 2011, pp. 1-29.

"Moving Object Segmentation Using Depth Images", U.S. Appl. No. 13/017,626, filed Jan. 31, 2011, pp. 1-31.

"Using a Three-Dimensional Environment Model in Gameplay", U.S. Appl. No. 13/017,729, filed Jan. 31, 2011, pp. 1-41.

"International Search Report & Written Opinion for PCT Patent Application No. PCT/US2013/077736", Mailed Date: Mar. 27, 2014, Filed Date: Dec. 26, 2013, 15 Pages.

Higo, et al., "A Hand-held Photometric Stereo Camera for 3-D Modeling", In International Conference on Computer Vision, Sep. 29, 2009, pp. 1234-1241.

Anderson, et al., "Augmenting Depth Camera Output Using Photometric Stereo", In Conference on Machine Vision Applications, Jun. 13, 2011, pp. 369-372.

"International Search Report & Written Opinion for PCT Patent Application No. PCT/US2014/016749", Mailed Date: May 12, 2014, Filed Date: Feb. 18, 2014, 8 Pages.

Daniel, et al., "Pose Tracking from Natural Features on Mobile Phones", In IEEE/ACM International Symposium on Mixed and Augmented Reality, Sep. 15, 2008, pp. 125-134.

Breiman, Leo, "Random Forests", In Machine Learning, vol. 45, Issue 1, Oct. 2001, pp. 5-32.

Veas, et al., "Creating Meaningful Environment Models for Augmented Reality", In IEEE Virtual Reality Conference, Mar. 8, 2008, pp. 295-296.

Besl, et al., "A method for registration of 3D shapes", Retrieved at <<http://www-evasion.imag.fr/people/Franck.Hetroy/Teaching/ProjetsImage/2007/Bib/besl_mckay-pami1992.pdf>>, IEEE Transactions on Pattern Analysis and Machine Intelligence, vol. 14, No. 2, Feb. 1992, pp. 239-256.

Blais, et al., "Registering Multiview Range Data to Create 3D Computer Objects", Retrieved at <<http://ieeexplore.ieee.org/stamp/stamp.jsp?tp=&arnumber=400574>>, IEEE Transactions on Pattern Analysis and Machine Intelligence. vol. 17, No. 8, Aug. 1995, pp. 820-824.

Campbell, et al., "Automatic 3D Object Segmentation in Multiple Views using Volumetric Graph-cuts", Retrieved at <<http://citeseerx.ist.psu.edu/viewdoc/download?doi=10.1.1.97.4463&rep=rep1&type=pdf>>, Image and Vision Computing, vol. 28, No. 1, Jan. 2010, pp. 10.

Chen, et al., "Object Modeling by Registration of Multiple Range Images", Retrieved at <<http://ieeexplore.ieee.org/stamp/stamp.jsp?tp=&arnumber=132043>>, IEEE International Conference on Robotics and Automation, Apr. 9-11, 1991, pp. 2724-2729.

Cohen, et al., "Interactive Fluid-particle Simulation using Translating Eulerian Grids", Retrieved at <<http://jcohen.name/papers/Cohen_Interactive_2010.pdf>>, Symposium on Interactive 3D Graphics and Games, Feb. 19-21, 2010, pp. 8.

Curless, et al., "A Volumetric Method for Building Complex Models from Range Images", Retrieved at <<http://citeseer.ist.psu.edu/viewdoc/download?doi=10.1.1.26.9436&rep=rep1&type=pdf>>, 23rd International Conference on Computer Graphics and Interactive Techniques, Aug. 4-9, 1996, pp. 1-10.

Davison, et al., "Mobile Robot Localisation using Active Vision", Retrieved at <<http://www.robots.ox.ac.uk/~lav/Papers/davison_murray_eccv1998/davison_murray_eccv1998.pdf>>, Proceedings of the 5th European Conference on Computer Vision, 1998, pp. 17.

Elfes, et al., "Sensor Integration for Robot Navigation: Combining Sonar and stereo range Data in a Grid-based Representation", Retrieved at <<http://ieeexplore.ieee.org/stamp/stamp.jsp?arnumber=04049608>>, Proceedings of the 26th Conference on Decision and Control, Dec. 1987, pp. 8.

Frahm, et al., "Building Rome on a Cloudless Day", Retrieved at <<http://wwwx.cs.unc.edu/~rraguram/papers/ECCV2010.pdf>>, In Proceedings of the European Conference on Computer Vision (ECCV), 2010, pp. 368-381.

Furukawa, et al., "Towards Internet-scale Multi-view Stereo", Retrieved at <<http://citeseerx.ist.psu.edu/viewdoc/download?doi=10.1.1.180.5239&rep=rep1&type=pdf>>, IEEE Computer Society Conference on Computer Vision and Pattern Recognition (CVPR), Jun. 2010, pp. 8.

Goesele, et al., "Multi-view Stereo Revisited", Retrieved at <<http://citeseerx.ist.psu.edu/viewdoc/download?doi=10.1.1.62.881&rep=rep1&type=pdf>>, IEEE Computer Society Conference on Computer Vision and Pattern Recognition, 2006, pp. 8.

Grand, Scott Le., "Broad-phase Collision Detection with CUDA", Retrieved at <<http://http.developer.nvidia.com/GPUGems3/gpugems3_ch32.html>>, In GPU Gems 3, Addison-Wesley Professional, 2007, pp. 32.

Hadwiger, et al., "GPU-Based Volume Ray-Casting with Advanced Illumination" and "Advanced Illumination Techniques for GPU Volume Raycasting", Retrieved at <<http://viscg.uni-muenster.de/publications/2009/RHRL09/siggraph09-coursenotes.pdf>>, ACM SIGGRAPH Asia courses, Dec. 10-13, 2008, pp. 56.

Harada, Takahiro., "Real-time Rigid Body Simulation on GPUs", Retrieved at <<http://http.developer.nvidia.com/GPUGems3/gpugems3_ch29.html>>, In GPU Gems 3, Addison-Wesley Professional, 2007, pp. 28.

Henry, et al., "RGB-D Mapping: Using Depth Cameras for Dense 3D Modeling of Indoor Environments", Retrieved at <<http://ils.intel-research.net/uploads/papers/3d-mapping-iser-10-final.pdf>>, In Proceedings of the International Symposium on Experimental Robotics (ISER), 2010, pp. 1-15.

Klein, et al., "Parallel Tracking and Mapping for Small AR Workspaces", Retrieved at <<http://ptam-gr.googlecode.com/svn-history/r30/trunk/references/PTAM/KleinMurray2007ISMAR.pdf>>, In Proceedings of the International Symposium on Mixed and Augmented Reality (ISMAR), 2007, pp. 10.

Levoy, et al., "The Digital Michelangelo Project: 3D Scanning of Large Statues", Retrieved at <<http://citeseerx.ist.psu.edu/viewdoc/download?doi=10.1.1.26.5681&rep=rep1&type=pdf>>, The 27th Internationl Conference on Computer Graphics and Interactive Techniques Conference, Jul. 23-28, 2000, pp. 1-14.

Lorensen, et al., "Marching Cubes: A High Resolution 3D Surface Construction Algorithm", Retrieved at <<http://citeseer.ist.psu.edu/viewdoc/download;jsessionid=419DA7BDC64749BF2761C21EA2534BD4?doi=10.1.1.132.3930&rep=rep1&type=pdf>>, Computer Graphics, vol. 21, No. 4, Jul. 1987, pp. 163-169.

Newcombe, et al., "Live Dense Re-construction with a Single Moving Camera", Retrieved at <<http://www.doc.ic.ac.uk/~ajd/Publications/newcombe_davison_cvpr2010.pdf>>, In Proceedings of the IEEE Conference on Computer Vision and Pattern Recognition (CVPR), Jun. 13-18, 2010, pp. 8.

Nguyen, Hubert., "GPU Gems 3", Retrieved at <<http://http.developer.nvidia.com/GPUGems3/gpugems3_pref02.html>>, 2007, pp. 4.

(56) References Cited

OTHER PUBLICATIONS

Osher, et al., "Level Set Methods and Dynamic Implicit Surfaces", Retrieved at <<http://kolxo3.tiera.ru/M_Mathematics/MN_Numerical%20methods/Osher%20S.,%20Fedkiw%20R.%20Level%20Set%20Methods%20and%20Dynamic%20Implicit%20Surfaces%20(ISBN%200387954821)(Springer,%202003)(288s)_MN_.pdf>>, Aug. 2002, pp. 288.

Parker, et al., "Interactive Ray Tracing for Isosurface Rendering", Retrieved at <<http://www.ppsloan.org/publications/iso98.pdf>>, Proceedings of the conference on Visualization, IEEE Visualization, Oct. 18-23, 1998, pp. 6.

Pollefeys, et al., "Detailed Real-time Urban 3D Reconstruction from Video", Retrieved at <<http://www.cs.hunter.cuny.edu/~ioannis/3DP_S09/UrbanScape_2008.pdf>>, International Journal of Computer Vision, vol. 78, No. 2-3, Jul. 2008, pp. 143-167.

Purcell, et al., "Ray Tracing on Programmable Graphics Hardware", Retrieved at <<http://citeseerx.ist.psu.edu/viewdoc/download?doi=10.1.1.127.4957&rep=rep1&type=pdf>>, in ACM SIGGRAPH Courses, 2005, pp. 703-712.

Rusinkiewicz, et al., "Real-time 3D Model Acquisition", Retrieved at <<http://mesh.brown.edu/3DPGP-2009/pdfs/Rusinkiewicz-sg02.pdf>>, In ACM Transactions on Graphics (SIGGRAPH), 2002, pp. 438-446.

Seitz, et al., "A Comparison and Evaluation of Multiview Stereo Reconstruction Algorithms", Retrieved at <<http://vision.middlebury.edu/mview/seitz_mview_cypr06.pdf>>, IEEE Computer Society Conference on Computer Vision and Pattern Recognition (CVPR), Jun. 17-22, 2006, pp. 8.

Stuehmer, et al., "Real-time Dense Geometry from a Handheld Camera", Retrieved at <<http://cvpr.in.tum.de/_media/spezial/bib/stuehmer_et_al_dagm10.pdf>>, In Proceedings of the DAGM Symposium on Pattern Recognition, Sep. 22-24, 2010, pp. 11-20.

Thrun, et al. "Probabilistic Robotics", Cambridge: MIT Press, 2005, pp. 56.

Vogiatzis, et al., "Reconstructing Relief Surfaces", Retrieved at <<http://mi.eng.cam.ac.uk/~cipolla/archive/Publications/article/2008-IVC-Vogiatzis.pdf>>, Image and Vision Computing, vol. 26, No. 3, Mar. 2008, pp. 397-404.

Wurm, et al., "OctoMap: A Probabilistic, Flexible, and Compact 3D Map Representation for Robotic Systems", Retrieved at <<http://ais.informatik.uni-freiburg.de/publications/papers/wurm10octomap.pdf>>, In Proceedings of the ICRA 2010 Workshop on Best Practice in 3D Perception and Modeling for Mobile Manipulation, 2010, pp. 8.

Zach, et al., "A Globally Optimal Algorithm for Robust TV-L1 Range Image Integration", Retrieved at <<http://www.icg.tugraz.at/Members/zach/my_publications/iccv2007.pdf>>, 11th International Conference on Computer Vision, ICCV, Oct. 14-20, 2007, pp. 8.

Zhou, et al., "Data-parallel Octrees for Surface Reconstruction", Retrieved at <<http://ieeexplore.ieee.org/stamp/stamp.jsp?tp=&arnumber=5473223>>, IEEE Transactions on Visualization and Computer Graphics, vol. 17, No. 5, May 2011, pp. 669-681.

Stein, et al., "Structural Indexing: Efficient 3-D Object Recognition", Retrieved at <<http://graphics.stanford.edu/~smr/ICP/comparison/stein-medioni-reg-pami92.pdf>>, IEEE Transactions on Pattern Analysis and Machine Intelligence, vol. 14, No. 2, Feb. 1992, pp. 125-145.

Cutts, Matt., "Matt Cutts: Gadgets, Google, and SEO", Retrieved at <<http://www.mattcutts.com/blog/>>, Aug. 25, 2011, pp. 7.

"Channel Access Method", Retrieved at <<http://en.wikipedia.org/wiki/Multiple_access_protocol#Circuit_mode_and_channelization_methods>>, Retrieved Date: Sep. 2, 2011, pp. 5.

Rusinkiewicz, et al., "Efficient Variants of the ICP Algorithm", Retrieved at <<http://www.cs.princeton.edu/~smr/papers/fasticp/fasticp_paper.pdf>>, Third International Conference on 3-D Digital Imaging and Modeling, 2001, pp. 1-8.

Henry, et al., "RGB-D Mapping: Using Depth Cameras for Dense 3D Modeling of Indoor Environments", Retrieved at <<http://ils.intel-research.net/uploads/papers/henry-RGBD10-RGBD-mapping.pdf>>, International Symposium on Experimental Robotics, 2010, pp. 2.

Lai, et al., "Sparse Distance Learning for Object Recognition Combining RGB and Depth Information", Retrieved at <<http://ils.intel-research.net/uploads/papers/kevin-RGBD10-sparse-distance.pdf>>, IEEE International Conference on Robotics and Automation, ICRA, May 9-13, 2011, pp. 6.

Krainin, et al., "Manipulator and Object Tracking for in Hand Model Acquisition", Retrieved at <<http://ils.intel-research.net/uploads/papers/krainin_icra10mm_in_hand_modeling.pdf>>, ICRA Mobile Manipulation Workshop, 2010, pp. 8.

\* cited by examiner

GENERATING COMPUTER MODELS OF 3D OBJECTS

BACKGROUND

Three-dimensional computer models of real-world objects are useful in a wide variety of applications. For example, such models can be used in applications such as immersive gaming, augmented reality, architecture/planning, robotics, and engineering prototyping.

However, generating an accurate computer model from a physical object often difficult and expensive. For example, 3D object scanning systems are known that use a turntable to rotate an object placed on the turntable at a known rate about a known axis. As the object is rotated, a fixed laser is used to read the distance to the object, and this can be combined with the known rotation to build up a 3D model of the object.

Such systems are limited in use because the turntable restricts the size and type of object that can be scanned, and it is complex to produce a turntable that rotates at a reliable known rate to produce an accurate computer model. The use of turntables also restricts the ability for different views or faces of an object to be scanned. Furthermore, whilst such an object scanning system can capture the shape of an object in a computer model, it does not capture the color or surface patterns of an object.

The embodiments described below are not limited to implementations which solve any or all of the disadvantages of known 3D object scanning systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Generating computer models of 3D objects is described. In one example, depth images of an object captured by a substantially static depth camera are used to generate the model, which is stored in a memory device in a three-dimensional volume. Portions of the depth image determined to relate to the background are removed to leave a foreground depth image. The position and orientation of the object in the foreground depth image is tracked by comparison to a preceding depth image, and the foreground depth image is integrated into the volume by using the position and orientation to determine where to add data derived from the foreground depth image into the volume. In examples, the object is hand-rotated by a user before the depth camera. Hands that occlude the object are integrated out of the model as they do not move in sync with the object due to re-gripping.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer gaming system, the system described is provided as an example and not a limitation. As those skilled in the art will appreciate, the present examples are suitable for application in a variety of different types of computing systems using 3D models.

Figure 1:
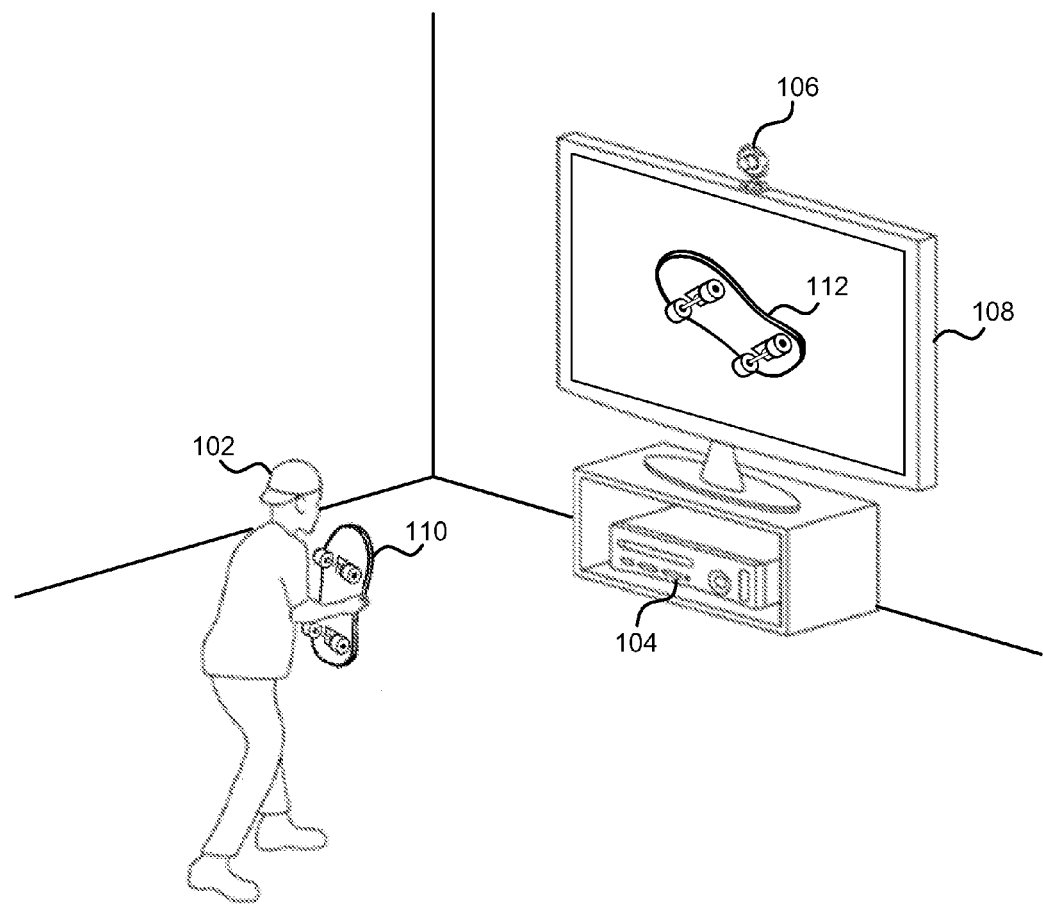
FIG. 1 illustrates a schematic diagram of a user holding a 3D object to be scanned in front of a depth camera.

FIG. 1 is a schematic diagram of a user 102 standing in a room comprising a computing device 104, such as a gaming system, connected to a depth camera 106 and a display device 108 such as a television. The depth camera 106 is capturing depth images of the room, and providing these to the computing device 104 for processing. The depth camera 106 is substantially static. The term "substantially static" is used in this context to mean that the depth camera 106 is not intentionally moved by the user. The depth camera 106 may be placed on a surface or held steady by the user, which may result in some limited movement of the depth camera 106. However, the depth camera 106 is not moved around the environment whilst capturing depth images.

The user 102 is holding an object 110 (in this illustrative example, a skateboard). The user wishes to capture a 3D computer model of this object 110. For example, the user 102 may want to generate a 3D model of their own skateboard for use within a computer game. In other examples, 3D models of real-world objects can be captured for purposes other than gaming.

The system described below allows the user 102 to generate a 3D model of the real-world object 110 by rotating or otherwise manipulating the object in front of the depth camera 106, such that all faces/aspects of the objects are shown to the depth camera 106. The depth camera 106 captures a sequence depth images comprising the object 110. These depth images are integrated together to form a "dense 3D model" of the object. "Dense" in this example refers to a high degree of accuracy and resolution of the model resulting from the use of all or many of the points from the incoming depth images to implicitly describe the object's surface. This can be contrasted with a "sparse" model that only takes a subset of the points to speed up calculations and reduce memory footprint. In other words, images captured by the depth camera 106 are used to form and build up a dense 3D model of the object 110 as the user rotates/moves it in front of the depth camera 106.

The system described is able to generate the 3D model in real-time, which enables the user to view the model being built up on the display device 108, as shown by the displayed image 112 of the model. This allows the user 102 to readily see which faces or parts of the object 110 have been captured, and which have not, thereby enabling the user to control how the object is manipulated in front of the depth camera 106 such that a full model is built up.

In the example of FIG. 1, the object 110 is held in the hands of the user 102 whilst being captured by the depth camera 106. Therefore, some parts of the object 110 are occluded by the hands and/or arms of the user 102. However, the hands and/or arms are automatically removed from the dense 3D model because the user naturally moves their hands to change grip as the object is rotated. This means that the hands do not follow the same movement as the object 110 in the depth images, enabling them to be automatically integrated out from the model, as described in more detail below. In alternative examples, the object 110 can be rotated in front of the depth camera without being hand-held by the user, for example by using a turntable or suspending the object from a line.

Figure 2:
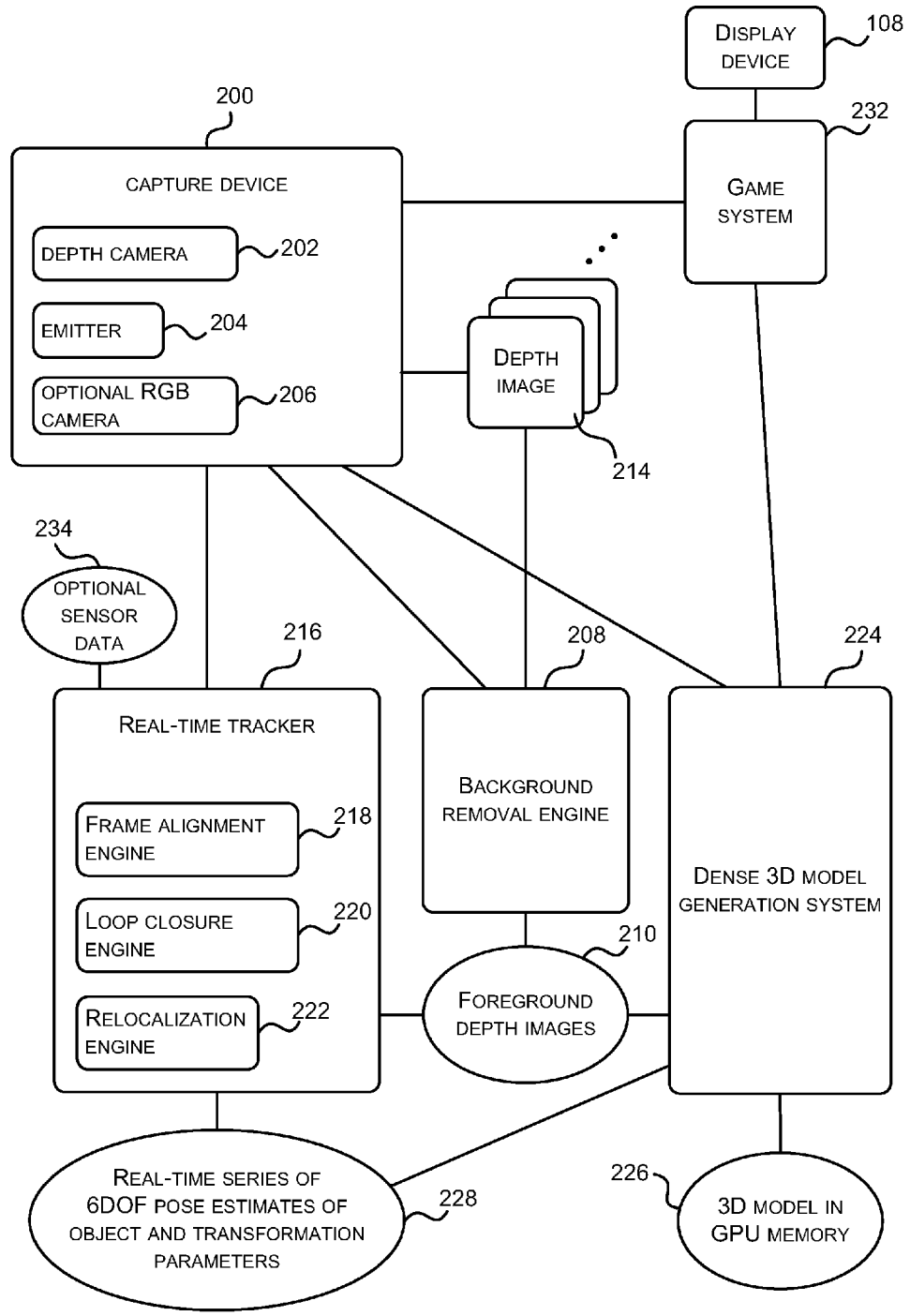
FIG. 2 illustrates a schematic diagram of a depth camera connected to a background removal engine, real-time object tracking system, a dense 3D model formation system and a game system.

Reference is now made to FIG. 2, which shows a schematic diagram of a capture device 200 for use with a real-time tracker 216, dense model generation system 224 and optionally a game system 232. The capture device 200 comprises a depth camera 202 which is arranged to capture sequences of depth images of a scene. Each depth image 214 (or depth map frame) comprises a two dimensional image in which each image element (e.g. pixel) comprises a depth value such as a length or distance from the camera to an object in the captured scene which gave rise to that image element. The term "image element" in this document is used to refer to a pixel, group of pixels, voxel, group of voxels, or other higher level component of an image. The depth value may be an absolute value provided in specified units of measurement such as meters, or centimeters or may be a relative depth value. In each captured depth image 214 there may be around 300,000 or more image elements each having a depth value. The frame rate of the depth camera 202 is high enough to enable the depth images to be used for working robotics, computer game or other applications. For example, the frame rate may be in the range of 20 to 100 frames per second.

The depth information may be obtained using any suitable technique including, but not limited to, time of flight, structured light, and stereo images. The capture device 200 may also comprise an emitter 204 arranged to illuminate the scene in such a manner that depth information may be ascertained by the depth camera 202.

For example, in the case that the depth camera 202 uses structured light to capture depth information, patterned light (e.g. light displayed as a known pattern such as spots, a grid or stripe pattern, which may also be time-varying) may be projected onto a scene using the emitter 204. Upon striking the surface of objects in the scene the pattern becomes deformed. Such a deformation of the pattern is captured by the depth camera 202 and analyzed to determine an absolute or relative distance from the depth camera 202 to the objects in the scene.

In some examples, in addition to the depth camera 202, the capture device 200 optionally also comprises a color video camera referred to as an RGB camera 206. The RGB camera 206 is arranged to capture sequences of images of the scene at visible light frequencies. The capture device 200 also comprises one or more processors, a memory and a communications infrastructure as described in more detail below.

The capture device 200 is connected to a background removal engine 208, a real-time tracker 216, a dense 3D model generation system 224, and optionally a game system 232 or other computing device or application. The connection from the capture device 200 may be a physical wired connection or may use wireless communications. In some examples the capture device 200 is connected indirectly to these other elements over one or more communications networks such as the internet. The background removal engine 208, real-time tracker 216, and dense 3D model generation system 224 may be computer-implemented using a general purpose microprocessor controlling one or more graphics processing units (GPUs), as described in more detail below.

The background removal engine 208 is arranged to process the depth images 214 to remove portions of the images that relate to unwanted portions of the scene (e.g. the background), and to leave a wanted portion of the depth image 210, i.e. a foreground portion that contains data relating to the object to be captured. The background of the scene includes the user 102 holding the object 110 and also any other visible parts of the environment behind or around the user (e.g. furniture). The foreground of the scene includes the object 110, and, in the case of a hand-held object, also usually includes at least a portion of the user's hands and arms.

By removing the unwanted portions from the depth images 214, subsequent processing can be reduced as unnecessary parts of the images are not being considered, and the accuracy of the object tracking can be improved. Techniques for performing the background removal are described below in more detail with reference to FIG. 5.

The real-time tracker 216 comprises a frame alignment engine 218 and optionally a loop closure engine 220 and a relocalization engine 222. The real-time tracker 216 takes depth image frames from the background removal engine 208, and optionally also input from the capture device 200, and optional sensor data 234. The real-time tracker 216 operates to place the portions of the foreground depth image frames showing the object into spatial alignment in order to produce a real-time series 228 of six degree of freedom (6DOF) pose estimates of the object 110. It may also produce transformation parameters for transforms between pairs of depth image frames. In some examples the real-time tracker 216 operates on pairs of foreground depth image frames from the background removal engine 208. In other examples, the real-time tracker 216 takes a single foreground depth image and aligns that with an output taken from a dense 3D model 226 of the object rather than with another depth image. The optional sensor data 234 can be in the form of an orientation sensor that is attached to or held against the object, and can be used to provide initial/rough motion or tracking information to assist the real-time tracker 216. In some examples, this can be in the form of a mobile telephone comprising an accelerometer that is held against the object, and wirelessly communicates motion data to the real-time tracker 216.

The frame alignment engine 218 of the real-time tracker is arranged to perform the alignment of the object depth image frames. It uses an iterative process which is implemented using one or more graphics processing units in order that the frame alignment engine operates in real-time. The loop closure engine 220 is arranged to detect when the object has moved in a loop so that the object portion depicted in the current depth frame is at least partially overlapping with that of a previous depth frame that has been integrated into the model. The relocalization engine 222 is arranged to deal with the situation where the real-time tracker loses the current object pose and relocalizes or finds the current pose again. The operation of the real-time tracker 216 is described in more detail below with reference to FIG. 6 to 10.

The real-time tracker 216 provides the camera pose as output to a dense 3D model generation system 224 which uses that information together with the foreground depth image frames to form and store a dense 3D model 226 of the object 110. This is described in more detail with reference to FIGS. 11 and 12 below. For example, in the case of FIG. 1 the 3D model would be a 3D model of the skateboard held by the user. The dense 3D model may be stored in GPU memory, as described below. The dense 3D model may be constructed in real-time, or the dense 3D model generation system 224 may collect the data on the camera pose and depth images and construct the 3D model at a later time.

The capture device 200 may be used in conjunction with a game system 232 which is connected to a display device 108. For example, the game may be a sports game, FPS game, motor car racing game or other type of computer game. The dense 3D model may be provided to the game system 232, and aspects of the model incorporated into the game. For example, the 3D model can be incorporated into the game itself (e.g. as in-game objects that the player can interact with). Data from the game system 232 such as the game state or metadata about the game may also be provided to the real-time tracker 216.

In order to assist the user with building the dense 3D model, feedback can be provided to the user in the form of real-time renderings of the dense 3D model. This enables the user to view the state of the dense model as it is constructed, thereby assisting the user in capturing portions of the object that have been missed. This provides a more interactive experience for the user. An example technique for rendering a view from the dense 3D model is discussed below with reference to FIG. 13. Audio or visual cues can also be provided to the user to guide them to areas that have been missed or are of poor quality in the dense 3D model.

As mentioned, the processing performed by the background removal engine 208, real-time tracker 216 and/or the dense 3D model generation system 224 can, in one example, be executed remotely from the location of the capture device 200. For example, the capture device 200 can be connected to (or comprise) a computing device having relatively low processing power, and which streams the depth images over a communications network to a server. The server has relatively high processing power, and performs the computationally complex tasks of the background removal engine 208, the real-time tracker 216 and/or the dense 3D model generation system 224. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

In a further example, the processing can be divided between local and remote computing devices. For example, the depth images can be transmitted over a communication network to a server in order to construct a high-resolution dense 3D model, which is returned on completion of the model, as described above. Concurrently with this, a low-resolution version of the model is constructed locally, using less processing power and memory, which is used to render a real-time view of the model for viewing by the user. This enables the user to get visual feedback from the model construction from a local processor, avoiding network latency issues.

Figure 3:
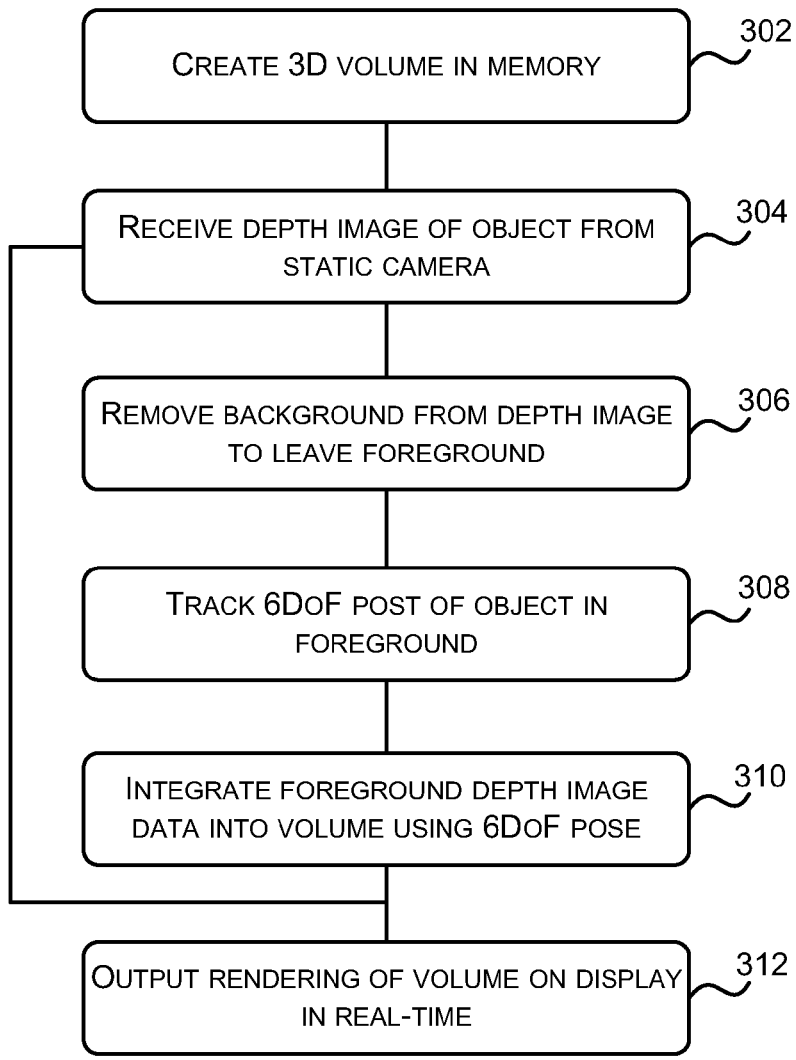
FIG. 3 illustrates a flowchart of a process for generating a computer model of a 3D object using a depth camera.

FIG. 3 shows a flowchart of a process for generating a computer model of a 3D object using the system of FIG. 2. In one example, the process of FIG. 3 can be implemented using a general purpose processor in combination with a GPU.

Firstly, a 3D volume is created 302 on a memory device for storing the model. In one example, the 3D volume is created on the memory of a graphics processing system, which enables fast, parallel access from a GPU.

The 3D volume can be visualized as a cuboid of memory, wherein each memory location is a voxel representing a point in space inside, around or on the object being modeled. Therefore, the 3D volume directly represents a spatial portion of the real-world environment comprising the object. As the 3D volume corresponds directly to a real-world volume, the size of the real-world volume represented in a fixed-size memory determines the model resolution. For example, if a large real-world volume is to be modeled, then each voxel of the memory represents a larger region in real-world space, and hence the resolution is lower than if a smaller real-world volume is modeled. If more memory is available, however, the large real-world volume can be modeled at a higher resolution. Efficient data storage strategies and/or compression algorithms can also be used to reduce memory footprint and increase spatial resolution.

Figure 4:
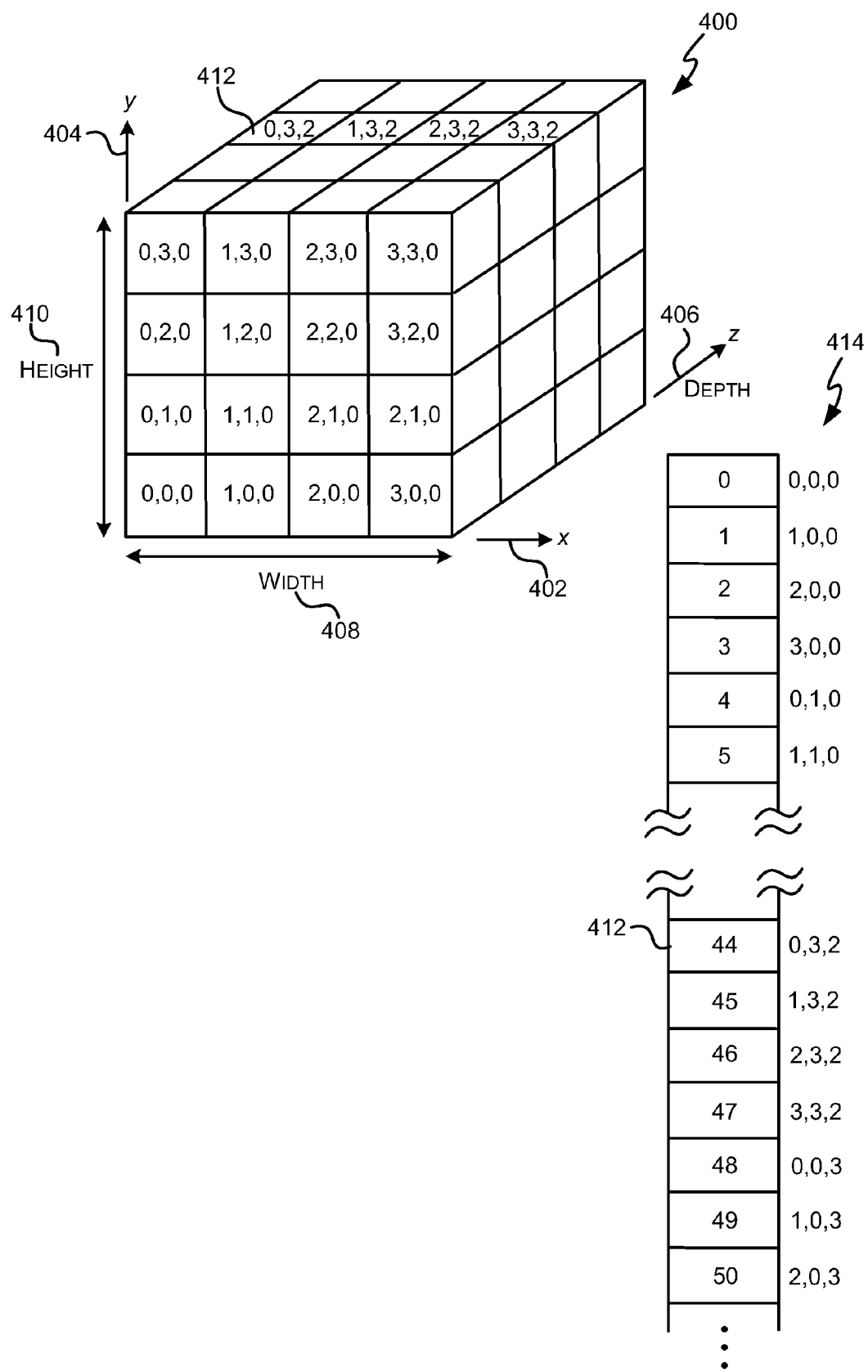
FIG. 4 illustrates a 3D volume constructed of linear pitched memory.

FIG. 4 illustrates an example of how the 3D volume can be constructed in the GPU memory. FIG. 4 shows an example 4×4×4 3D volume 400. This is merely an illustrative example, and actual 3D volumes can be larger or smaller. The 3D volume has an x-axis 402, y-axis 404, and z-axis 406. The number of voxels along the x-axis 402 defines the volume width 408 (four in this example), and the number of voxels along the y-axis 404 defines the volume height 410 (also four in this example). Individual voxels can then be identified using x, y, z coordinates. For example, voxel 412 has coordinates (0,3,2). Because the relationship between the 3D volume and the size of the real-world volume that it is representing is known, voxels in the 3D volume can have their location converted between 3D volume coordinates and real-world coordinates.

However, the physical memory device used to store the model is not generally arranged as a cuboid such as that illustrated in FIG. 4. Instead, the memory device generally comprises a linear array of memory locations, such as memory array 414. To create the 3D volume on a memory array, each voxel is mapped to a memory array index by: $x+(y\times width)+(z\times width\times height)$. For example, for the voxel 412 having coordinates (0,3,2) this translates to an index of 44, as illustrated in FIG. 4. This arrangement is called linear pitched memory, and provides fast, parallel access to the data stored on the GPU memory, as described below. The data stored in the memory can also be aligned such that the storage addresses of the data is spaced in power-of-two strides, for example by padding out the data to align with these boundaries. This enables processing to be performed on the data without the use of a generic multiplication, thereby further increasing computational speed.

Note that, in alternative examples, the model can be stored in a different manner from a 3D volume such as that described above. For example, data structures such as oct-trees can be used to further reduce memory consumption and speed up computations. Alternatively, a transfer function between 3D space and a lower dimensional representation can be applied to increase storage efficiency. An example of this type of transfer function is called "geometry images".

Returning to FIG. 3, a depth image is received 304 from a substantially static depth camera (such as depth camera 106 in FIG. 1). As mentioned, the depth image comprises a depth value at each image element (e.g. pixel) relating to a distance from the depth camera to a point in a scene viewed by the camera. The scene, and hence the depth image, comprises the object being captured.

The depth image is provided to the background removal engine 208, which selects and removes 306 image elements that are determined to relate to unwanted portions of the depth image (i.e. portions of the depth image determined to not relate to the object being captured). This leaves a wanted portion of depth image comprising the object (and possibly other items such as the user's hands or other nearby items). The background removal can be performed using several different techniques as described in more detail below.

The 6DOF position and orientation of at least a portion of the object in the foreground depth image is then tracked 308 using the real-time tracker 216. This provides data describing what the pose of the object is in the depth image. This 6DOF pose can be relative to an arbitrary origin, such as the first depth image received. The 6DOF position and orientation of the object is determined by computing registration parameters, which are parameters of a transformation for aligning the foreground depth image and a preceding depth image. In other words, this transformation defines how the object has moved between the preceding depth image and the current depth image. This is described in more detail with reference to FIG. 6 to 10.

The 6DOF position and orientation of the object can then be used to integrate the depth data from the foreground depth image into the 3D volume. The 6DOF pose is used to determine where in the 3D volume the depth image data can be integrated, so that it aligns with other data that may already be in the volume (e.g. from previous, different views of the object). This is done by using the 6DOF position and orientation to determine a corresponding location in the depth image for each voxel of the volume, determining a factor relating to the distance between each voxel and the depth value at the corresponding location in the depth image, and updating a stored value at each voxel using this factor. In one example, the factor is a function called the truncated signed distance function (TSDF), as described in more detail below with reference to FIGS. 11 and 12.

The process then repeats as new depth images are received. These new depth images are processed in a similar manner, and added into the dense model being built up in the 3D volume. Therefore, in this way, the model in the 3D volume becomes increasingly detailed and covers more viewpoints of the object as the object is rotated and/or moved in front of the depth camera. In parallel with receiving more depth images, an image of the model stored in the 3D volume can be rendered 312 in real-time and output for display on a display device. In some examples, this can be performed using ray-casting from the volume, as described in more detail with reference to FIG. 13 below.

Figure 5:
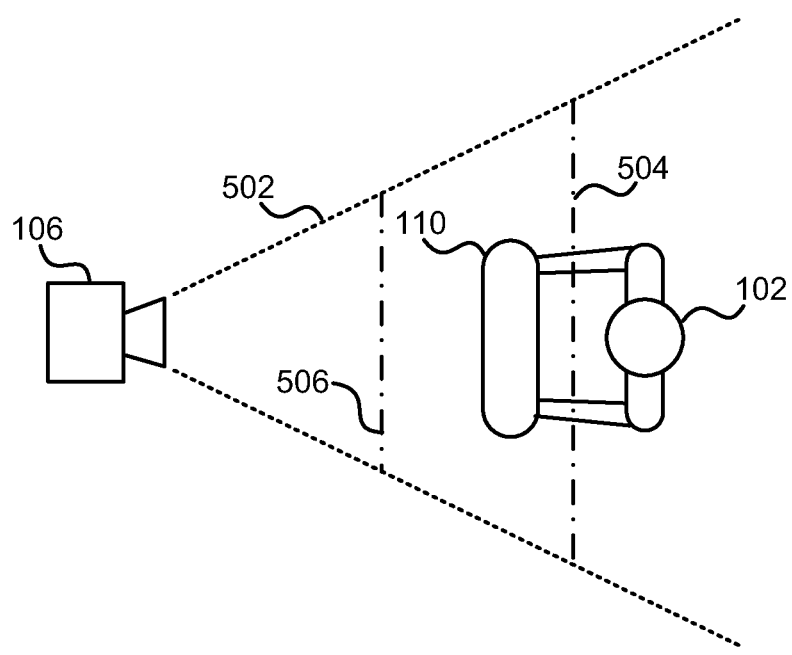
FIG. 5 illustrates a schematic diagram of a depth image background removal operation.

FIG. 5 illustrates a first example of a background removal technique that can be used by the background removal engine 208. FIG. 5 shows an overhead view of the user 102 holding the object 110 (e.g. skateboard) out in front of them. The depth camera 106 has a frustum 502 that defines the extent of the depth images captured. In a first example, the background removal engine defines a distance threshold 504, which acts as a foreground-background cut-off. With such a technique, each image element in the depth image having a depth value greater than the threshold 504 is determined to relate to the unwanted background, and can be removed. Conversely, each image element having a depth value less than or equal to the threshold 504 is determined to relate to the wanted foreground, and is retained.

This type of background removal technique is effective when combined with a real-time display of the construction of the model. This allows the user to visually see whether they have brought the object to be modeled into the foreground region ahead of the threshold 504 and ensure that it is held here whilst being rotated and captured.

In further examples, more complex thresholds defining the wanted portion can be applied. For example, a second foreground threshold such as threshold 506 in FIG. 5 can be defined, such that only items between the two thresholds 504, 506 are determined to relate to the foreground. In this way, a spatial region is defined between the two thresholds, in which objects can be held to be captured. In further examples, more thresholds can also be defined such that only objects located within a predefined cuboid region in the camera frustum 502 are determined to relate to the foreground. Alternatively, different shaped regions such as spheres or ovoids within the camera frustum 502 can define the foreground region.

In some examples, the size and shape of a foreground region used by the background removal engine can be user defined. For example, the user can set the extent and/or dimensions of a foreground region using a user input device such as a game controller, mouse or keyboard. Alternatively, the user can use a gesture to set the foreground region. For example, the user can define the foreground region by holding their hands out to define the corners of a cuboid that sets the foreground region. This can be displayed to the user on the display device to provide visual feedback.

Another example of a background removal technique utilizes the depth camera to pre-record the background prior to capturing the object. Before the user presents the object for capture to the depth camera, the user stands in front of the depth camera, and this captures the scene including the user and any other background elements (e.g. furniture). Then, when the object is being modeled, each depth image can be compared to the known background depth image. Background elements that are substantially similar between the two depth images, such as background furniture and the user, can be identified and removed from the depth image.

In another example, a background removal technique can monitor motion of objects in the depth images. For example, a depth image can be compared to a previously received depth image to determine whether movement has occurred in portions of the depth image. If so, then the moving portions are likely to relate to the wanted object being captured (as this is being rotated before the depth camera). The image elements that are substantially stationary are likely to relate to background/unwanted regions, and can be removed.

In a further example, body part classification techniques can be used to assist with the background removal. Depth camera-based computing systems, such as games systems, already employ body part classification techniques to enable the control of the computing system. Such techniques use classification algorithms (such as trained decision forests) to identify and label body parts of the user in the depth images. This can be used with the background removal to identify the user's body parts and remove these from the depth image (as it is known that these do not relate to the object).

Further optional image processing operations can also be performed after the background has been removed using one or more of the techniques described above, to further enhance the wanted portion of the depth image. For example, as it is likely that the foreground depth image comprises the hands of the user, a hand removal operation can be performed. This attempts to identify the image elements relating to the hand and remove these. In one example, this can utilize the color image from the RGB camera to identify the hands using skin tones. In another example, body-part classification techniques can be used to identify hand poses, and remove the image elements classified as belonging to a hand.

Once the background removal engine has generated the foreground depth image, it can be provided to the real-time tracker to determine the 6DOF pose of the object, as follows.

Figure 6:
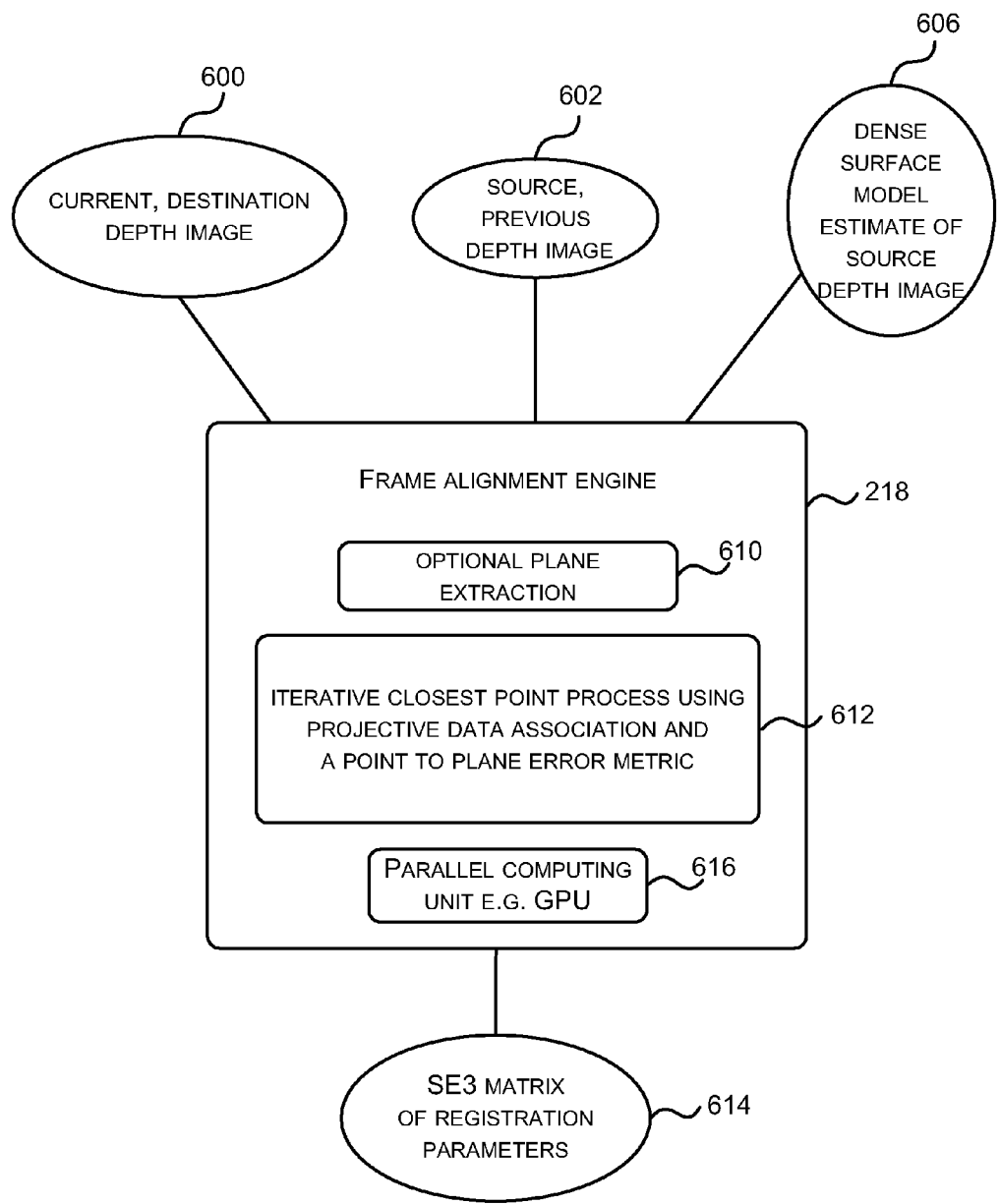
FIG. 6 illustrates a schematic diagram of an example frame alignment engine.

Reference is now made to FIG. 6 to 10, which describe the operation of the real-time tracker 216 in more detail. FIG. 6 is a schematic diagram of the frame alignment engine 218 of FIG. 2. The frame alignment engine 218 is computer implemented at a computing device having one or more GPUs 616 or other parallel computing units. For example, the parallel computing units may be vector processors, single instruction multiple data (SIMD) architectures, graphics processing units or other parallel computing devices. It comprises a plane extraction component 610 which is optional and an iterative closest point (ICP) process 612. The iterative closest point process uses projective data association and a point-to-plane error metric as described in more detail below.

The frame alignment engine receives the current depth image 600 from the depth camera. This is also referred to as the destination depth image. In some examples it also receives a source depth image 602 which is the previous depth image from the depth camera. In other examples, the frame alignment engine takes a dense surface model estimate 606 of the source depth image. The output of the frame alignment engine is a set of registration parameters of a transform for aligning at least a portion of the current and source depth images. The aim is to align the portion of the current and source depth images comprising the object being modeled. In some examples these registration parameters are provided as a six degree of freedom (6DOF) pose estimate in the form of an $SE_3$ matrix describing the rotation and translation of the depth camera 202 relative to real-world coordinates. More formally, this transformation matrix can be expressed as:

$$T_k = \begin{bmatrix} R_k & t_k \\ 0^T & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3:=\{R, t | R \in SO_3, t \in \mathbb{R}^3\}$. Coordinates in the camera space (i.e. from the camera perspective) can be mapped to real-world coordinates by multiplying by this transformation matrix. However, the registration parameters may be provided in any suitable form. These registration parameters are used by the real time tracker 216 to produce the real-time series of 6 degree-of-freedom pose estimates of the object.

In order to determine the 6DOF pose estimate for the object in the depth image, the real-time tracker first determines what part of the depth image to track. Even after the background removal operation, the depth image may still comprise parts that do not relate to the object. For example, the user's hands and/or arms may still be present, as well as any other items that may be in proximity to the object being modeled (e.g. other parts of the user's body or nearby furniture).

In one example, the tracking operation can be performed on all the image elements of the foreground depth image, using ICP as described below. This assumes that the object being modeled is the largest rigid body that is seen in the foreground depth image. Therefore, the alignment between the source and destination depth images that aligns the majority of the image elements corresponds to alignment (and hence tracking) of the object being modeled. This technique can be improved by controlling the background removal process such that the foreground depth image mainly comprises the object. For example, this can be achieved using foreground thresholds that are set such that they encompass the object closely.

In another example, rather than performing the tracking using all the image elements of the foreground depth image, the tracking operation can instead use a subset of the image elements. For example, a subset of image elements from a central region of the foreground depth image can be used for the tracking. This can be effective as it is likely that the object is generally centered in the depth image.

In a further example, additional image processing operations can be performed to attempt to locate the object within the foreground depth image, such that it can be tracked accurately. For example, edge detection algorithms can be used to attempt to detect the edges (i.e. extent) of the object being modeled, and the tracking can be performed on the image elements determined to be within the object. The edge detection algorithm can be performed using either the depth image or the RGB image from the RGB camera 206, or a combination of the two. The RGB image from the RGB camera 206 can also be used to identify the extent of the object by analyzing color changes between image elements.

Once either all or a portion of the foreground depth image is selected for tracking (regardless of which technique above is used), the tracking is performed using the frame alignment engine as described below.

Figure 7:
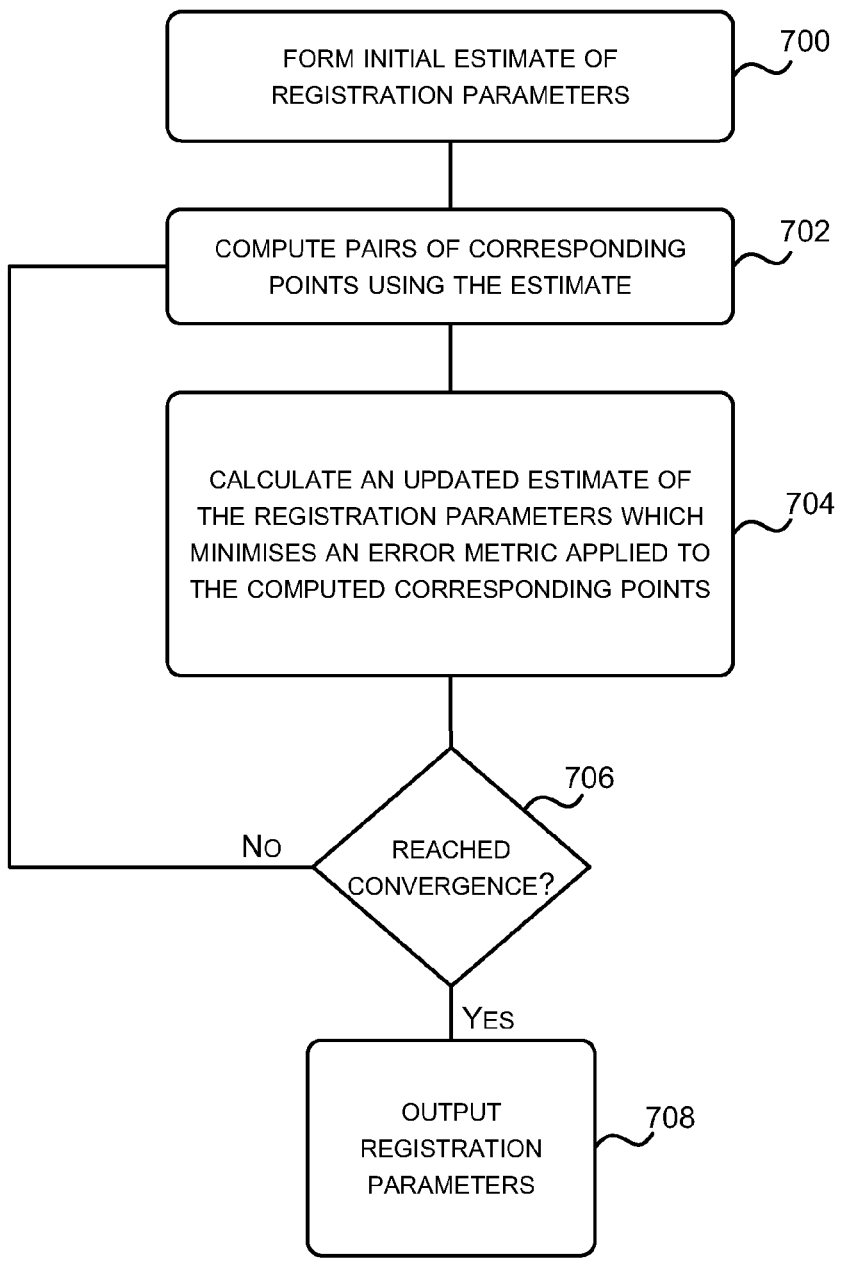
FIG. 7 illustrates a flow diagram of an iterative process for object tracking.

FIG. 7 is a flow diagram of an example iterative process at a frame alignment engine. An initial estimate of the registration parameters is formed 700. These are the registration parameters of a transform for aligning the object between the current and source depth images. This initial estimate is formed in any suitable manner, for example using RGB camera output, or sensor data 234 from a sensor attached to or held on the object (e.g. an orientation sensor in a mobile telephone as mentioned above). In another example, the initial estimate is formed by predicting where the object is using information about the previous motion path of the object. For example, the object may be assumed to have a constant velocity or a constant acceleration. The motion path of the object from time 0 to time t−1 may be used to estimate where the object will be at time t and thus obtain an estimate of the registration parameters.

Using the initial estimate, pairs of corresponding points between the current and source frames (depth images or estimated depth images) are computed 702. A pair of corresponding points is a point from one depth image and a point from another depth image, where those points are estimated to have arisen from the same real world point in a scene. The term "point" is used here to refer to a pixel, or a group or patch of neighboring pixels. This correspondence problem is difficult because of the huge number of possible combinations of points. Previous approaches using color or grey-scale images have addressed this problem by identifying shapes such as lines, edges, corners or the like in each image and then trying to match those shapes between the pair of images. In contrast, the embodiments described herein identify corresponding points without the need to find shapes in the depth images. More detail about how the corresponding points are computed is given below with reference to FIG. 8. An updated estimate of the registration parameters is calculated 704 which optimizes an error metric applied to the computed corresponding points.

A check is made to assess whether convergence has been reached 706. If so, there is little or no change in the updated estimate and the registration parameters are output 708. If not, the iterative process repeats as indicated in FIG. 7.

Figure 8:
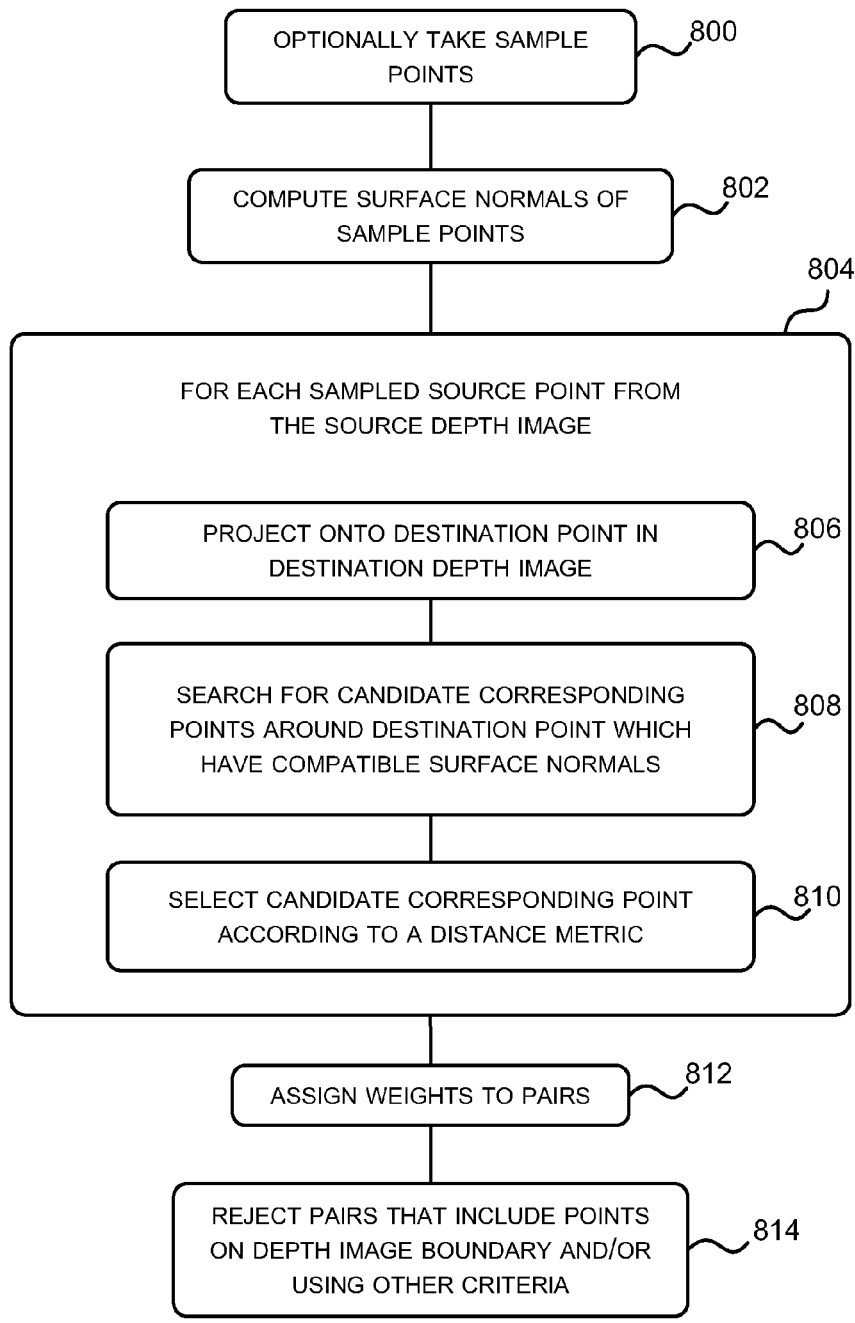
FIG. 8 illustrates a flow diagram of a process for computing pairs of corresponding points using predictions from a dense 3D model.

With reference to FIG. 8 more detail is now given about how the pairs of corresponding points are calculated. In some embodiments sample points are taken 800 from either or both of the current and source depth images and those sample points are used as candidates to find pairs of corresponding points. Sampling may be achieved by randomly selecting a specified proportion of the points. In another embodiment sampling is achieved in a manner which takes into account surface normals of the points. For example, a surface normal is calculated for each point (as described in more detail below) and a histogram created with a plurality of bins for different ranges of surface normal values. Sampling is carried out so that a uniform sampling across the bins is achieved.

By using sampling the benefit that computational costs are reduced is achieved. However, a risk is that the accuracy and robustness of the process is reduced when sampling is used. This is because the sample points may not provide a good indication of the depth image that the samples were taken from. For example, the samples may enable the process to find a set of corresponding points which the process identifies as a solution but which in fact represent a locally optimal solution rather than a globally optimal solution.

Having said that, it is not essential to use any sampling. The process is also workable and gives good results when all the available points are used. In this case the parallel processing implementation described herein allows the process to operate in real-time for all the selected points in each depth image. In the example described below with reference to FIG. 8 the process is described as using sampling. However, the process of FIG. 8 is also applicable where no sampling is carried out.

As indicated in FIG. 8, surface normals of the sample points (or each available point in the case that no sampling is done) are computed 802. For example, this is achieved for a given point by finding two (or more) nearest neighbor points in the depth image and computing a surface patch which incorporates those neighbors and the point itself. A normal to that surface patch is then calculated at the location of the point.

In the case that the source depth image is estimated from the dense 3D model (rather than a previous depth image), a surface normal prediction and a surface location prediction is computed from the dense 3D model for each predicted sample point. A predicted sample point is a point from the dense 3D model which is at the same pixel location as a sample point from the current depth image. This is done by projecting a ray into the volume of the dense surface model. The ray is projected from an estimated object position and orientation associated with the current depth image and into the 3D model through a point on a face of that 3D model which corresponds to a sample point in the current depth image.

A process of finding 804 corresponding pairs of points is then followed. For each sampled source point from the source depth image, a ray is projected 806 from the camera location associated with the source depth image, through the sampled source point and onto a destination point in the destination depth image. In some cases the destination point may be in front of the sampled source point along the projected ray. This projection process may be referred to as "projective data association". A search 808 is then made for candidate corresponding points around and including the destination point. For example, the search is for points which have surface normals that are compatible with the surface normal of the sampled source point and which are within a specified Euclidean distance of the destination point. Surface normals are said to be compatible if they are within a specified range of one another. For example, this specified range and the Euclidean distance may be user configurable and/or set using empirical data relating to the particular application conditions concerned.

One or more candidate corresponding points are found as a result of this search. From those candidate corresponding points a single point is selected 810 to form a pair with the source point. This selection is made on the basis of a distance metric. For example, a Euclidean distance is calculated between the source point and each of the candidate corresponding points. The pair which gives the smallest Euclidean distance is then selected. The process of box 804 is then repeated for each of the sampled source points or in the case that no sampling is done, for each of the available points of the source depth image.

In some embodiments weights are assigned 812 to each of the pairs of corresponding points. For example weights may be assigned using information from other sources such as an RGB camera or other sensors. In an example, a weight related to measurement characteristics of the depth camera such as radial lens distortion and/or depth dependent error is computed and stored with each of the pairs of corresponding points. In another example, pairs that include a point which is at an edge detected in the depth image using an edge detection algorithm are weighted higher than other pairs. These weights may be used during the process of applying the error metric in order to improve the quality of the results. For example, weights related to depth dependent error enable high depth values which are likely to fluctuate a lot due to the lack of precision to be taken into account.

In some embodiments pairs that include a point which is on or near a depth image boundary are rejected 814. This helps to avoid errors where overlap between the two depth images is only partial. Other criteria may also be used to reject pairs. For example, in some embodiments plane extraction is carried out as mentioned above with reference to FIG. 6 component 610. In that case, pairs which are on a plane may be rejected in order to prevent the tracker being biased by a large plane and so ignoring smaller but unique parts within a depth image.

Once pairs of corresponding points have been identified using the process of FIG. 8, then an error metric is computed and minimized and the iterative process of FIG. 7 repeats.

In an example a point-to-plane error metric is computed 900 for the pairs of corresponding points and this metric is optimized to obtain updated registration parameters. An example of this process is now described with reference to FIG. 9. This process is designed to be implemented using at least one GPU in order to obtain real time processing as now described.

Computing the point-to-plane error metric can be thought of as computing 902 a sum of squared distances from each source point to a plane which contains the destination point and which is oriented approximately perpendicular to the surface normal of the destination point. The process seeks to optimize this metric to find an updated set of registration parameters. Solving this type of optimization problem is not straightforward and typically requires significant computational resources so making this type of process difficult to implement for real time applications. An example implementation using at least one GPU is now described which enables real-time processing.

The pairs of corresponding points may be scaled and translated 904. This may improve the stability of the optimization process but is not essential.

For each pair of corresponding points a linear system comprising a plurality of simultaneous equations is formed 906 on a parallel computing unit such as a GPU in order to optimize the error metric using numerical least squares optimization. These matrices are reduced to a single 6 by 6 matrix on the parallel computing unit. Because the frame rate is high (for example, 20 to 40 frames per second) then it is possible to make a small angle approximation for the angle (change in object orientation) between any two successive frames. That is, because the frame rate is so high, the object will only have moved a small amount between frames. By making this approximation the operation of the system in real-time is facilitated.

The single 6 by 6 matrix is passed to a CPU 908 and solved to find updated registration parameters. The solution is scaled and translated 910 back to reverse the scaling and translation step of 904. The stability of the solution is checked 912 and the updated registration parameters 914 are output by the process.

Figure 10:
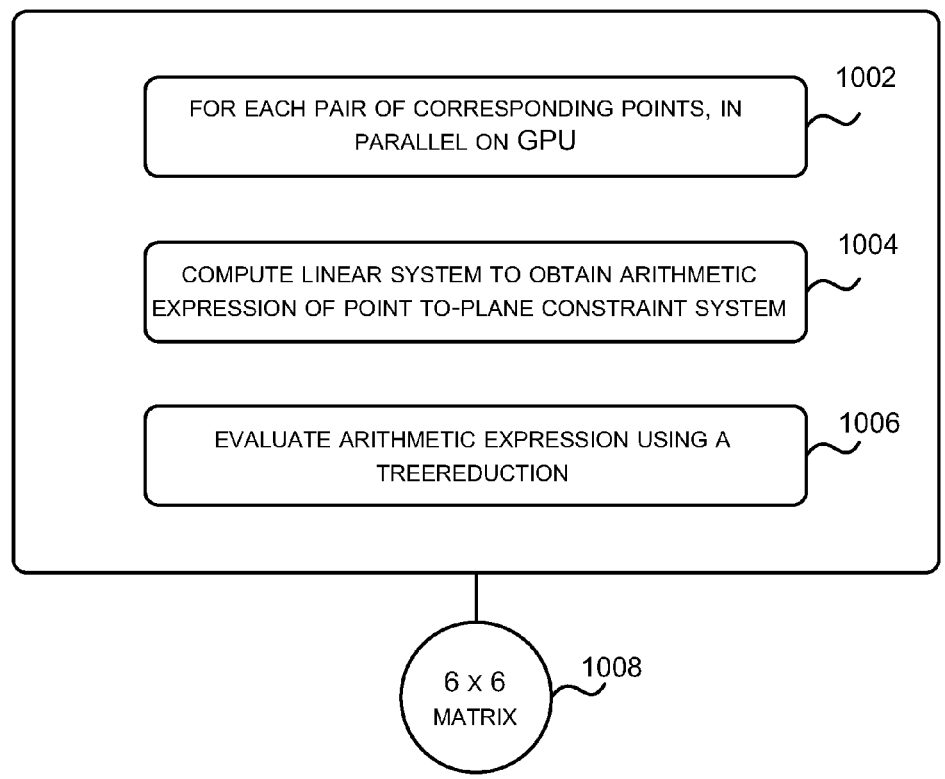
FIG. 10 illustrates a flow diagram of a process at a parallel computing unit such as a graphics processing unit (GPU)

FIG. 10 gives more detail about how the linear system may be formed on a parallel computing unit such as a GPU and reduced to a 6×6 matrix. In this example, the following point-to-plane error metric is used although this is not essential; other error metrics may also be used:

$$\mathrm{argmin}_{T \in SE_3} \sum_{\substack{u \in U \\ \rho_k(u) \neq null}} \left( (Tv_k(u) - \hat{v}^g_{k-1,\rho_k(u)}) \cdot \hat{n}^g_{k-1,\rho_k(u)} \right)^2.$$

This error metric may be used to obtain a new transformation $T_k$. More detail about the symbols used is now given. The current frame k of the depth camera $D_k$ provides calibrated depth measurements $d=D_k(u)$ at image pixel $u=(x,y)$ in the image domain $u \in U$. These measurements may be re-projected into the camera's world space as $v_k(u)=(xd,yd,d,1)$ (using homogeneous coordinates). Since each frame from the depth sensor is a surface measurement on a regular grid, the system may also compute the corresponding normal vectors $n_k(u)$ which are estimated by finite differences between neighbouring re-projected grid points. The $SE_3$ transformation matrix maps the camera coordinate frame at time k into the global frame g as $v_k^g(u)=T_k v_k(u)$ (the equivalent mapping of normal vectors is $n_k^g(u)=R_k n_k(u)$). An estimate of the 3D model in the global coordinate system at time k is denoted $M_k$ which may be stored in a volumetric representation, described herein. An incoming depth frame $D_k$ is registered against the previous frame's estimate of the full 3D reconstructed model $M_{k-1}$ by ray-casting into the previous frame's camera pose $T_{k-1}$. This results in predicted image $\hat{D}_{k-1}$ or equivalently a set of global model points $\hat{v}^g_{k-1,i}$ and model normals $\hat{n}^g_{k-1,i}$, where $i \in S$ is the corresponding index set. The symbol $\rho_k$ in the above equation for the point to plane error metric represents the protective data association mapping between camera and model points at time k.

Figure 9:
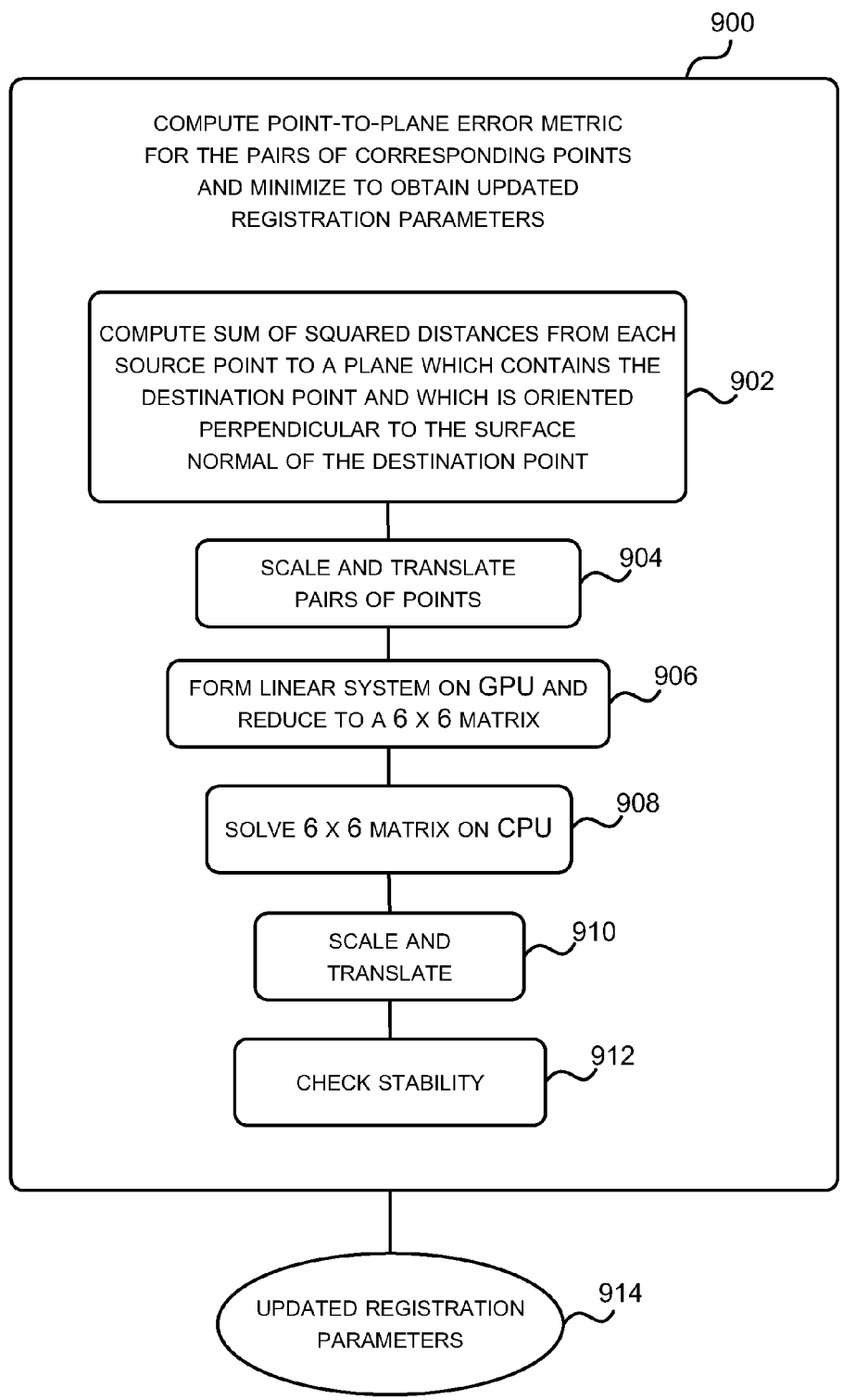
FIG. 9 illustrates a flow diagram of a process for computing and minimizing a point-to-plane error metric for use in the iterative process of FIG. 7.

The method of FIG. 10 is thus an example implementation of the process illustrated in FIG. 9 of forming linear systems for each pair of corresponding points on the GPU and reducing 906 to a single 6 by 6 matrix 1008. In this example, each pair of corresponding points that is identified by the frame alignment engine 218 may be processed in parallel 1002 at the GPU. Thus for each pair of corresponding points, a 6 by 6 matrix expression a linear system is computed 1004 which gives an arithmetic expression of a point-to-plane constraint system. By making the small angle assumption the transformation T may be parametrised using a 3 vector of incremental rotations by a skew symmetric matrix $R \approx [\alpha,\beta,\gamma]_x$ together with a 3 element translation vector t. A linear system is obtained by setting the first derivative of the linearised error metric to zero. This point-to-plane constraint system expresses the optimization of the point-to-plane error metric mentioned above. This computation occurs in parallel for each pair of corresponding points at the GPU. In this way the error metric is applied to each of the identified corresponding points in parallel. The arithmetic expression for each pair of points is evaluated using a tree reduction process 1006 or other suitable method of evaluating an arithmetic expression. A tree reduction process is an evaluation strategy whereby an arithmetic expression is represented as a tree structure with nodes of the tree representing arithmetic operations and leaf nodes of the tree representing values. The expression is evaluated in an order according to the tree structure by passing results of evaluations along the branches of the tree. Together the results of the error metric optimization process from the parallel processes provide the 6 by 6 matrix output 1008 by reducing the 6 by 6 matrix for each pair of corresponding points into a single 6 by 6 matrix.

Figure 11:
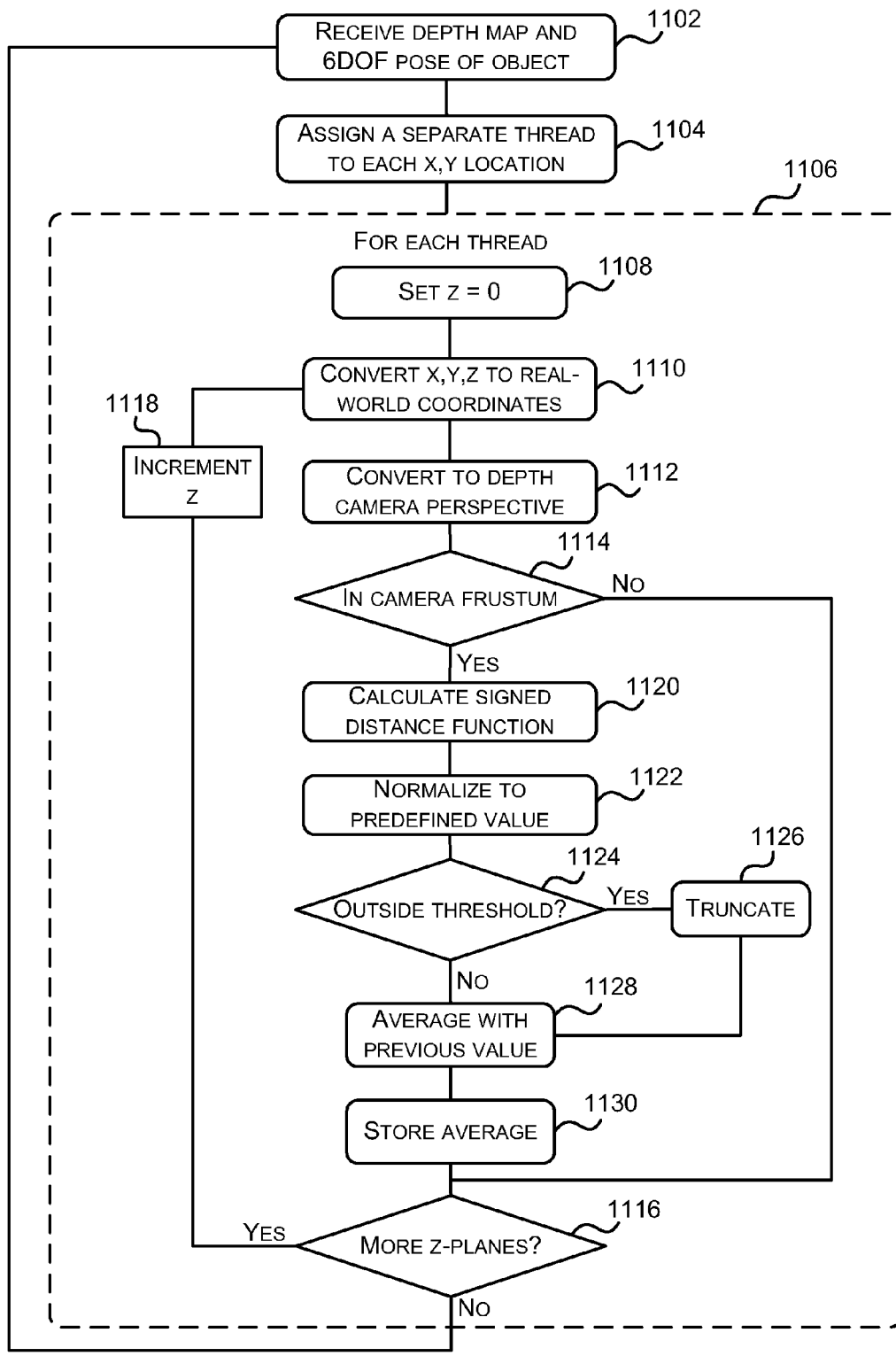
FIG. 11 illustrates a flowchart of a parallelizable process for generating a 3D environment model.

As mentioned above with reference to FIG. 3, once the 6DOF pose estimate for the object has been determined, the data from the depth image can be integrated into the model stored in the 3D volume. Reference is now made to FIG. 11, which illustrates a flowchart of a parallelizable process for integrating the depth data into the 3D model. In one example, the process of FIG. 11 is executed on a GPU processor, a multi-core processor, or other type of processor allowing a high degree of execution parallelism. In a further example, a single-core processor can also be used, if it is sufficiently fast.

The modeling process starts by receiving 1102 the foreground depth image and the 6DOF pose estimate of the object in that depth image. The 6DOF pose estimate indicates the location and orientation of the object relative to its originally viewed position, and is provided by the real-time tracker 316. A separate execution thread is assigned 1104 to each voxel in a plane of the 3D volume 400. For example, if the plane of the volume is the z-plane, then an execution thread is assigned to each combination of x- and y-coordinate of the 3D volume. Considering the 3D volume of FIG. 4, this results in sixteen threads, assigned to the voxels having x, y coordinates of: (0,0); (1,0); (2,0); . . . (1,3); (2,3); (3,3).

Figure 12:
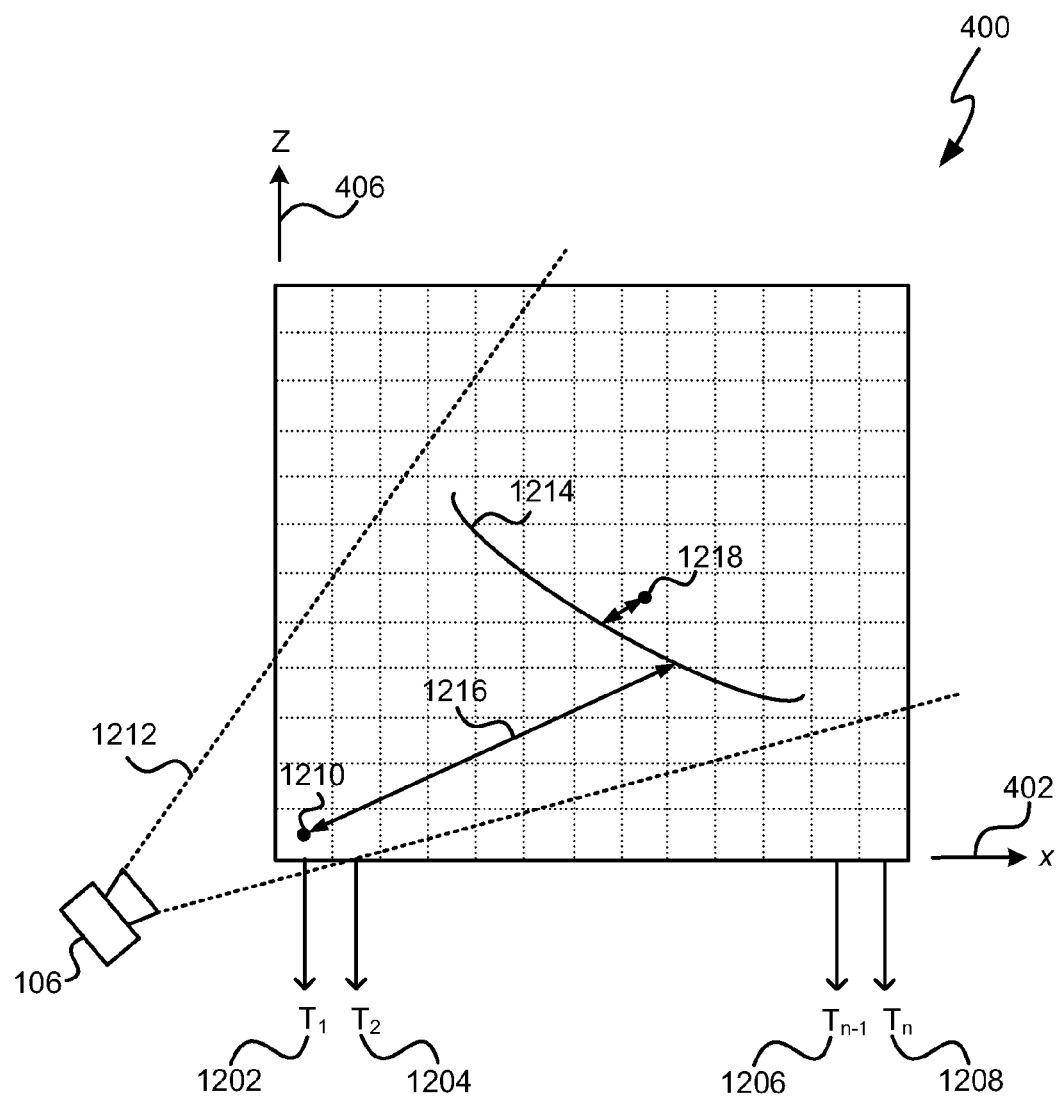
FIG. 12 illustrates an example parallelizable signed distance function calculation.

Each separate execution thread then performs the same operations, as indicated by box 1106 in FIG. 4. The operations performed by each thread are illustrated diagrammatically in FIG. 12. FIG. 12 shows a top-down view of 3D volume 400 (i.e. showing the x-axis 402 and z-axis 406, and the y-axis is ignored for the purposes of clarity). An execution thread is assigned to each coordinate on the z-plane of the volume, denoted $T_1$ 1202, $T_2$ 1204, ... $T_{n-1}$ 1206, $T_n$ 1208. The operations performed by each thread in box 1106 are firstly illustrated with reference to $T_1$ 1202.

The z-coordinate for the execution thread is set 1108 to zero, and the x,y,z coordinates for the voxel associated with the thread are converted 1110 to "object coordinates". "Object coordinates" are real-world coordinates that are fixed relative to the object being scanned. This is the same effect as if the object is maintained in a fixed position, and the depth camera is moved around the object. For example, in the case of thread $T_1$ 1202, the x,y coordinate associated with the thread is (0,0), so when the z-coordinate is set to zero, this gives coordinates of (0,0,0) (i.e. voxel 1210 in FIG. 12) which can be converted to object coordinates. Once the object coordinates for voxel 1210 have been determined, they can be transformed using the 6DOF location and orientation of the object to determine a corresponding location in the depth image for this voxel. This means that the object coordinates for the current voxel associated with the thread is perspective projected through the depth camera's view of the object, and can take into account the intrinsic parameters of the camera (known as the projection matrix). In other words, if the voxel representing this point in object coordinates is being viewed by the depth camera, this determines what the coordinates are in the depth image for that point. The depth camera-perspective coordinates for the voxel are denoted pX, pY, pZ. The depth camera-perspective coordinates can be converted to depth image pixel coordinates (denoted u,v) by u=pX/pZ and v=pY/pZ.

The perspective of the depth camera viewing the object is shown illustrated in FIG. 12 by the dashed lines indicating the frustum 1212 of the depth camera. FIG. 6 also shows the object's surface 1214 in the depth image output from the depth camera.

The depth image coordinates (u,v) for the voxel currently associated with the thread are used to determine 1114 whether the voxel is located within the frustum 1212 of the depth camera. If not, then this voxel can be skipped. With reference to FIG. 12, it is noted that, in the case of thread $T_1$, the current voxel 1210 is within the frustum 1212 of the camera. This can be contrasted to, for example, the first voxel considered by thread $T_{n-1}$, which is outside the camera frustum 1212, and hence skipped.

If it is determined that the current voxel is within the camera frustum 1212, then a factor relating to the distance between the voxel and a point in the environment at the corresponding location to the voxel from the camera's perspective is determined. The point in the environment at the corresponding location can be given by the depth value in the depth image at (u,v). Therefore, with reference to FIG. 12, this factor considers distance 1216 between voxel 1210 and the point on surface 1214 in the depth image that maps onto the voxel 1210.

In one example, the factor calculated 1120 is a signed distance function, although any implicit surface representation can be applicable (e.g. one where the exact surface location can be determined by numerical methods and interpolation between a limited number of stored points on a regular grid). A signed distance function calculation gives the value of the distance between the current voxel and the corresponding point in the depth image, and is signed such that voxels outside (i.e. external to) the corresponding point in the depth image (from the camera's perspective) are given a positive distance, and voxels inside (i.e. internal to) the corresponding point in the depth image (from the camera's perspective) are given a negative distance. A value of zero indicates that the associated voxel is exactly coincident with the corresponding point. The signed distance function can be calculated readily from the depth value at (u,v) in the depth image minus pZ.

For example, voxel 1210 in FIG. 12 is in front of the corresponding point on surface 1214, and hence has a positive signed distance function value. Conversely, voxel 1218 in FIG. 12 is behind its corresponding point on surface 1214, and hence has a negative signed distance function value.

The signed distance function value is then normalized 1122 to a predefined distance value. In one example, this predefined value can be a small distance such as 5 cm, although any suitable value can be used. For example, the normalization can be adapted depending on the noise level and the thickness of the object being reconstructed. This can be defined manually by the user, or derived automatically though analysis of the noise in the data. It is then determined 1124 whether the normalized distance is greater than a positive threshold value (if the signed distance is positive) or less than a negative threshold value (if the signed distance is negative). If so, then the signed distance function values are truncated 1126 to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function (TSDF).

For example, referring to FIG. 12, voxel 1210 is a relatively large distance outside surface 1214, and hence may be truncated to +1. Conversely, voxel 1218 is a relatively short distance inside surface 1214, and hence may not be truncated, and keep its normalized distance (e.g. −0.6 for example).

The normalized (and if appropriate, truncated) signed distance function value is then combined with any previous value stored at the current voxel. In the case that this is the first depth image incorporated into the 3D volume, then no previous values are present. However, as further frames from the depth camera are received and incorporated, then values can already be present at a voxel.

In one example, the signed distance function value is combined with a previous value by averaging 1128. For example, an exponentially decaying moving average can be used. In another example, the average can be a weighted average that uses a weighting function relating to the distance of the associated voxel from the depth camera. The averaged signed distance function values can then be stored 1130 at the current voxel. In an alternative example, two values can be stored at each voxel. A weighted sum of the signed distance function values can be calculated and stored, and also a sum of the weights calculated and stored. The weighted average can then be computed as (weighted sum)/(sum of weights).

By updating values previously stored in the volume, the model adapts effectively and automatically to moving elements that are not part of the object. For example, any elements in the depth image that are not part of the model (such as the user's hands, arms, or other background) do not move in synchronization with the object. For example, the user re-grips the object has it is rotated in front of the depth camera, which means that the user's hands do not move in tandem with the object. As a result of this, whilst data relating to the user's hands/arms may initially be incorporated into the 3D model, these will be integrated out over time as the user's hands/arms move and new data is added.

It is then determined 1116 whether all the z-planes of the 3D volume have been considered by this thread. If not, then the z-coordinate is incremented 1118, and the process repeats for the next voxel in the z direction. In other words, the thread starts to iterate through equivalent voxels (i.e. ones with the same x,y coordinate) along the z direction of the volume, determining the truncated signed distance function values and averaging them with previous values.

This is repeated until the thread has iterated through all the z-planes. This is performed by each thread, each of which is allocated to a different x,y coordinate on the z-plane. This sequence of one plane of the volume at a time has good memory access efficiency characteristics, for the memory layout in FIG. 4, since one z-plane corresponds to a small contiguous region of the linear pitched array. Hence, once this is completed by all threads the whole 3D volume has been analyzed, and a truncated signed distance function calculated for each voxel relative to the depth image. The process then waits for the next depth image frame from the depth camera to be received, and starts again, adding more values to the 3D volume where possible.

The result of this process is a 3D volume that comprises voxels having an averaged value between −1 and +1 (although note that this average value may be represented by multiple values such as the "weighted sum" and "sum of weights" values above). An averaged value of zero indicates that a surface in the environment is present at that location. Because multiple frames of depth images are added to the volume over time, the model stored in the volume is gradually built up in more and more detail. Repeated measurements of the same region of the environment add more detail and effectively increase the resolution of the information provided by the depth camera. Furthermore, unwanted moving elements such as the user's hands (and other noise) is also effectively averaged out from the depth images, leaving a much smoother surface. This enables detail to be seen in the model that cannot be seen from an individual depth image.

The use of separate execution threads in this manner enables computationally efficient processing over the whole 3D volume. For example, GPU processors are arranged to efficiently execute parallel program threads, where each thread is performing the same operations. This enables the model generation process described above with reference to FIG. 11 to be performed in real-time, such that the model is constructed at the frame-rate of the depth camera.

In addition to building up a dense model describing the surface of the object, color information from the RGB camera can also be concurrently captured, and used in combination with the dense model to create a colored model of the object. For example, RGB scanning can be performed in tandem with integration of depth data into the model, such that color data from the RGB camera is added at each voxel along with the depth information. The RGB color data can be averaged with previous values as more images are received (in a similar manner to depth data), which can even out lighting effects. Alternatively (or additionally), the RGB color data can be stored as the object is rotated, and used to generate a texture map, which can subsequently be mapped onto the surface of the dense 3D model when it is rendered.

Figure 13:
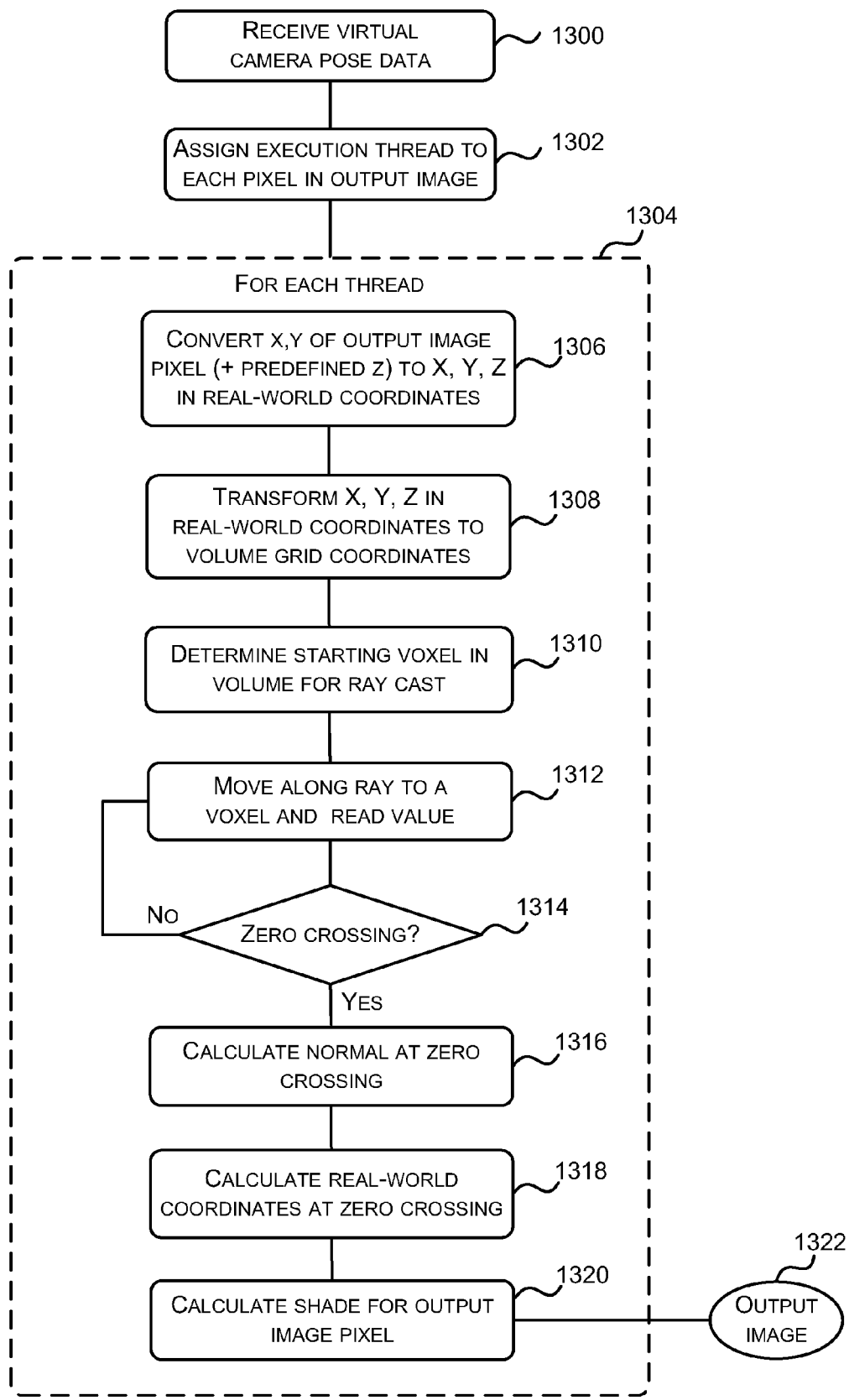
FIG. 13 illustrates a flowchart of a parallelizable process for raycasting from the 3D volume storing the model.

Once a model of the object has been constructed in a 3D volume as described above, it can be utilized in a number of ways. For example, views of the model stored in the volume can be rendered using a raycasting technique, as shown in FIG. 13. The flowchart of FIG. 13 shows a parallelizable process for raycasting from the 3D volume, which is suited for execution on a GPU or multi-core CPU in a similar manner to the model generation process above.

To render a view of the model, a pose of a virtual camera defining the viewpoint for the image to be rendered is firstly received 1300. This pose can be in the form of a 6DOF location and orientation of the virtual camera. A separate execution thread is then assigned 1302 to each pixel in the image to be rendered.

The operations shows in box 1304 are then performed by each execution thread to determine the value (e.g. shade, color etc.) to be applied to the thread's associated pixel. The x- and y-coordinates for the pixel associated with the thread are combined with a predefined initial z-value to give a 3D coordinate for the pixel, and the pose of the virtual camera is used to convert 1306 this 3D x, y, z coordinate for the pixel into real-world coordinates, denoted X, Y, Z. The real-world coordinates X, Y, Z can then be transformed 1308 into voxel coordinates in the 3D volume.

These coordinates define a point on a ray for the pixel having a path emanating from the virtual camera location through the 3D volume. It is then determined 1310 which voxel in the 3D volume is the first touched by this ray, and this is set as the starting voxel for the raycasting. The raycasting operation moves 1312 along the ray (from the starting voxel) and reads the averaged signed distance function values of the voxels touched by the ray, at each voxel determining 1314 whether a zero-crossing in the voxel values has occurred (i.e. a sign change between the averaged signed distance function values stored in one voxel on the ray to the next voxel along the ray). Optionally, this can be arranged to determine the presence of a sign-change only from positive through zero to negative. This enables a distinction to be made between surfaces viewed from the front and surfaces viewed from "inside" the object.

When a zero-crossing is detected, this indicates the presence of a surface in the model (as described above). Therefore, this indicates the voxel at which the surface intersects the ray. A suitable linear interpolation technique can be used between the signed distance function values of the voxels on the ray either side of the zero crossing can be used to more precisely localize the zero crossing, and therefore the intersection with the zero-crossing surface. In one example, the surface intersection point along a ray can be computed using a simple linear interpolation given trilinearly sampled points either side of the detected zero crossing to find the point at which a zero occurs. At the point at which the zero-crossing occurs, a surface normal is calculated 1316. This can be performed using the gradient from neighboring voxels. Linear interpolation can also be used to more accurately determine the gradient from neighboring voxels, and hence generate a more accurate surface normal. In one example, the surface normal can be computed using a backward difference numerical derivative, as follows:

$$\hat{n}(x) = \frac{\nabla f(x)}{\|\nabla f(x)\|}, \nabla f = \left[\frac{\partial f}{\partial x}, \frac{\partial f}{\partial y}, \frac{\partial f}{\partial z}\right]^T$$

Where $\hat{n}(x)$ is the normal for voxel x, and f(x) is the signed distance function value for voxel x. This derivative can be scaled in each dimension to ensure correct isotropy given potentially arbitrary voxel resolutions and reconstruction dimensions.

The coordinates of the voxel at which the zero-crossing occurs are converted 1318 into real-world coordinates, giving the real-world coordinates of the location of surface in the model. From the real-world coordinates of the surface, plus its surface normal, a shade and/or color can be calculated 1320. The calculated shade and/or color can utilize data derived from the RGB camera, as mentioned above, or can be based on any suitable shading model. The calculated shade and/or color can also take into account the location of a virtual light source.

As mentioned, the operations in box 1304 are performed by each execution thread in parallel, which gives a shade and/or color for each pixel in the final output image. The calculated data for each pixel can then be combined to give an output image 1322, which is a rendering of the view of the model from the virtual camera.

The parallel nature of the above-described raycasting operation enables views of the 3D environment to be rendered in real-time. Execution of the raycasting operation on a GPU when the model is stored in a 3D volume in GPU memory is fast and computationally efficient.

The raycasting operation can also be further enhanced by employing an empty space skipping algorithm. Because each ray may touch hundreds of voxels along its path, it is beneficial to avoid wasting computational resources by analyzing empty voxels (i.e. those that do not contain any information on the model). In one example, to avoid analyzing every single voxel along a ray, if the value at a voxel is greater than a predefined value then more than one voxel along the ray is skipped. The number of voxels skipped and the predefined value can be defined to trade off efficiency versus raycast accuracy, provided that these parameters are selected using knowledge of the predefined distance value (controlling the normalization) discussed above to ensure that the zero-crossing is not missed due to the space-skipping.

In another example, space skipping can be performed by utilizing a multi-level data structure such as N-ary trees, e.g. oct-trees. Here, at least one additional volume from the main 3D volume, with a lower resolution than the 3D volume, is generated. A low resolution volume can be analyzed first, to determine where along a ray there is empty space, and the main 3D volume can be analyzed for the parts of the ray that pass through non-empty voxels.

In further examples, the model stored in the 3D volume can be used to extract a polygon mesh representation of the environment. This can be achieved for example using the marching cubes algorithm, the marching tetrahedrons algorithm, the Bloomenthal Polygonizer, or any other suitable algorithm for selecting polygons representing portions of the model. A polygon representation of the model can be useful for physics-based applications, prototyping, or other applications that utilize a constant "water-tight" surface.

In some examples, the model stored in the 3D volume can also be compared to a database of known objects in order to derive further information or improve the model further. For example, a model of an object (e.g. the skateboard of FIG. 1) can be compared to a pre-prepared object database. If this determines that a sufficiently close match for the skateboard is found, then this can provide additional data on the model, such as indicating that the wheels are able to rotate (which may not be derivable from the scanned model). A match in the pre-prepared object database can also enable the pre-prepared object model to be obtained and replace the scanned object model, which may be of a lower resolution. The comparison operation with the pre-prepared object database can, in some examples, be performed at a remote network server, such that the object model is transmitted to the server for comparison and additional information or a high-resolution model is sent back.

Figure 14:
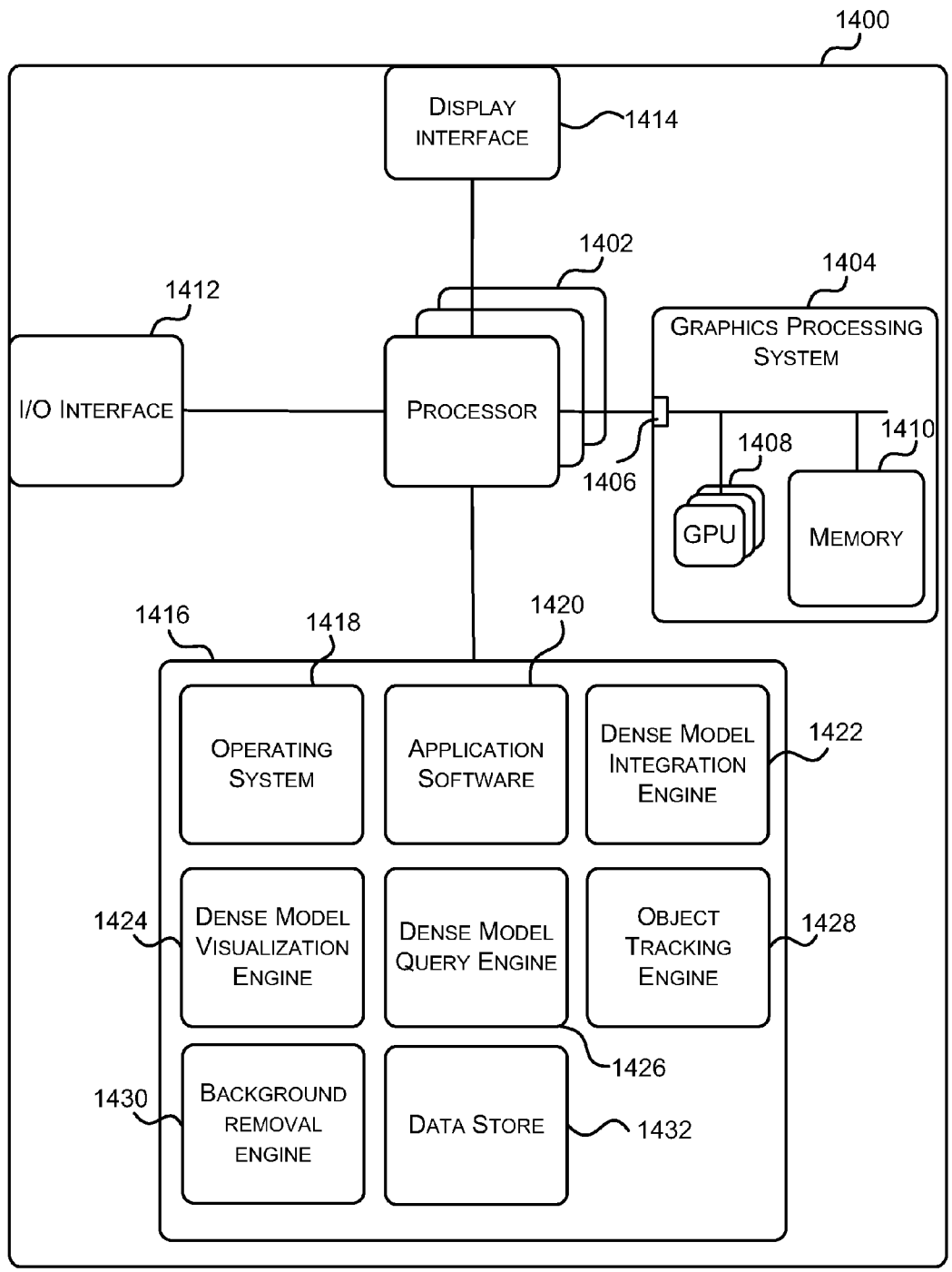
FIG. 14 illustrates an exemplary computing-based device in which embodiments of the 3D object scanning techniques may be implemented.

Reference is now made to FIG. 14, which illustrates various components of an exemplary computing-based device 1400 which may be implemented as any form of a computing and/or electronic device, and in which embodiments of the above-described 3D environment modeling techniques may be implemented.

Computing-based device 1400 comprises one or more processors 1402 which may be microprocessors, controllers or any other suitable type of processors for processing computing executable instructions to control the operation of the device in order to perform 3D reconstruction. In some examples, for example where a system on a chip architecture is used, the processors 1402 may include one or more fixed function blocks (also referred to as accelerators) which implement a part of the modeling methods in hardware (rather than software or firmware).

The computing-based device 1400 also comprises a graphics processing system 1404, which communicates with the processors 1402 via a communication interface 1406, and comprises one or more graphics processing units 1408, which are arranged to execute parallel, threaded operations in a fast and efficient manner. The graphics processing system 1404 also comprises a memory device 1410, which is arranged to enable fast parallel access from the graphics processing units 1408. In examples, the memory device 1410 can store the 3D volume, and the graphics processing units 1408 can perform the tracking, model generation and raycasting operations described above.

The computing-based device 1400 also comprises an input/output interface 1412 arranged to receive input from one or more devices, such as the capture device (comprising the depth camera), and optionally one or more user input devices (e.g. a game controller, mouse, and/or keyboard). The input/output interface 1412 may also operate as a communication interface, which can be arranged to communicate with one or more communication networks (e.g. the internet).

A display interface 1414 is also provided and arranged to provide output to a display system integral with or in communication with the computing-based device. The display system may provide a graphical user interface, or other user interface of any suitable type although this is not essential.

The computer executable instructions may be provided using any computer-readable media that is accessible by computing based device 1400. Computer-readable media may include, for example, computer storage media such as memory 1416 and communications media. Computer storage media, such as memory 1416, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1416) is shown within the computing-based device 1400 it will be appreciated that the storage may be distributed or located remotely and accessed via a network or other communication link (e.g. using input/output interface 1412).

Platform software comprising an operating system 1418 or any other suitable platform software may be provided at the computing-based device to enable application software 1420 to be executed on the device. The memory 1416 can store executable instructions to implement the functionality of a dense model integration engine 1422 (e.g. arranged to build up the model in the 3D model using the process described with reference to FIG. 11), a dense model visualization engine 1424 (e.g. arranged to output a rendered image of the model using the raycasting process of FIG. 13), a dense model query engine 1426 (arranged to get data from the model, e.g. for estimating previous depth images), an object tracking engine 1428 (arranged to generate the 6DOF object pose as shown in FIG. 6 to 10), and a background removal engine 1430 (arranged to generate the foreground depth image as described with reference to FIG. 5). The memory 1416 can also provide a data store 1432, which can be used to provide storage for data used by the processors 1402 when performing the 3D modeling techniques, such as for storing a polygon mesh.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of generating a 3D model of an object, comprising:

organizing, in a memory device, storage of data associated with a three-dimensional volume associated with the model, the volume comprising a plurality of voxels;

receiving a depth image from a substantially static depth camera, the depth image comprising a depth value at each image element relating to a distance from the depth camera to a scene comprising the object;

selecting and removing one or more image elements determined to relate to an unwanted portion of the scene to leave a wanted portion of the depth image comprising the object;

tracking the position and orientation of at least a portion of the object in the wanted portion of the depth image by computing registration parameters, the registration parameters being parameters of a transformation for aligning the wanted portion of the depth image and a preceding depth image; and integrating the wanted portion of the depth image into the volume by, for each voxel: using the position and orientation to determine a corresponding location in the depth image for the voxel, determining a factor relating to the distance between each voxel and the depth value at the corresponding location, and updating a stored value at the voxel using the factor, wherein determining the factor comprises calculating a signed distance function between the associated voxel and a point in the scene at the corresponding location.

2. A method according to claim 1, wherein the step of tracking the position and orientation of at least a portion of the object in the wanted portion of the depth image comprises tracking the position and orientation of the largest rigid object present in the wanted portion of the depth image.

3. A method according to claim 1, wherein the step of selecting and removing one or more image elements determined to relate to the unwanted portion of the scene comprises selecting and removing image elements located outside a three-dimensional region within the frustum of the depth camera.

4. A method according to claim 3, wherein the dimensions of the three-dimensional region are defined by a user using at least one of an input device and a gesture read by the depth camera.

5. A method according to claim 1, wherein the step of selecting and removing one or more image elements determined to relate to the unwanted portion of the scene comprises comparing the depth image with the preceding depth image to detect movement within the scene, and removing one or more image elements relating to substantially stationary portions of the scene.

6. A method according to claim 1, wherein the image elements from the wanted portion of the depth image are displayed on a display device in substantially real-time.

7. A method according to claim 1, wherein the volume is created on the memory device as linear pitched memory.

8. A method as claimed in claim 1, wherein the preceding depth image is estimated from the model stored in the volume.

9. A method according to claim 1, further comprising receiving a red-green-blue image from an RGB camera substantially co-located with the depth camera, the red-green-blue image comprising a color value at each image element.

10. A method according to claim 9, further comprising determining a corresponding voxel in the volume for each image element of the red-green-blue image and integrating the color value into the volume at the corresponding voxel by updating a previously stored color value.

11. A method according to claim 9, wherein the step of selecting and removing one or more image elements determined to relate to the unwanted portion of the scene comprises analyzing the red-green-blue image to detect one or more image elements relating to hands of the user and removing corresponding image elements from the wanted portion of the depth image.

12. A method according to claim 1, wherein computing the registration parameters comprises using an iterative process to identify corresponding points in pairs of depth images without computing shapes depicted within the depth images, and by using a parallel computing unit to optimize an error metric applied to the identified corresponding points such that the error metric is applied to each of the identified corresponding points in parallel.

13. A method according to claim 12, wherein computing the registration parameters further comprises using an iterative process to identify corresponding points in a pair of red-green-blue images from an RGB camera substantially co-located with the depth camera, the red-green-blue image comprising a color value at each image element.

14. A method as claimed in claim 12, wherein using the parallel computing unit to optimize an error metric comprises, for each pair of corresponding points, forming a linear system for a numerical least squares optimization and reducing the linear systems to a single 6 by 6 matrix at the parallel computing unit.

15. A method according to claim 1, wherein the step of integrating the wanted portion of the depth image into the volume comprises:
assigning a separate execution thread to each voxel in a plane of the volume;
each execution thread performing the steps of using the position and orientation to determine a corresponding location in the depth image for its associated voxel, determining a factor relating to the distance between the associated voxel and the point in the environment at the corresponding location, and updating a stored value at the associated voxel using the factor; and
each execution thread iterating through an equivalent voxel in each remaining plane of the volume and repeating the steps of determining the factor and updating the stored value for each voxel.

16. A method according to claim 1, wherein determining the factor comprises calculating the signed distance function between the associated voxel and the point in the scene at the corresponding location, such that if the associated voxel is located at a first side of the point, then the factor has a positive value, and if the associated voxel is located at an opposite side of the point, then the factor has a negative value.

17. A 3D object scanning system, comprising:
an input interface arranged to receive a depth image from a substantially static depth camera, the depth image comprising a depth value at each image element relating to a distance from the depth camera to a scene comprising the object;
a memory device; and
at least one processor arranged to: organize, in the memory device, storage of data associated with a three-dimensional volume associated with a scanned model of the object the volume comprising a plurality of voxels; select and remove one or more image elements determined to relate to an unwanted portion of the scene to leave a wanted portion of the depth image comprising the object, identification of the unwanted portion being based at least in part on the unwanted portion not moving in tandem with the wanted portion; track the position and orientation of at least a portion of the object in the wanted portion of the depth image by computing registration parameters, the registration parameters being parameters of a transformation for aligning the wanted portion of the depth image and a preceding depth image; and integrate the wanted portion of the depth image into the volume by using the position and orientation to determine a corresponding location in the depth image for each voxel, determining a factor relating to the distance between each voxel and the depth value at its corresponding location, and updating a stored value at each voxel using the factor, wherein determining the factor comprises calculating a signed distance function between the associated voxel and a point in the scene at the corresponding location.

18. A system according to claim 17, wherein the processor is a graphics processing unit arranged to provide concurrent execution of a plurality of threads, and the processor is further arranged to assign a separate thread to each voxel in a plane of the volume.

19. A system according to claim 17, wherein the object is rotated in the frustum of the depth camera by a user's hands or a turntable.

20. One or more device-readable media, the device-readable media being hardware with device-executable instructions that, when executed by a processor, direct the processor to perform steps comprising:
organizing, in a memory device, storage of data associated with a three-dimensional volume associated with a 3D model of all sides of a real-world object, the volume comprising a plurality of voxels;

receiving a depth image from a substantially static depth camera, the depth image comprising a depth value at each pixel relating to a distance from the depth camera to a point in a scene comprising the object;

selecting and removing pixels from the depth image that relate to points in the scene that are outside a predefined three-dimensional region within the depth camera frustum to leave a foreground depth image;

tracking the position and orientation of at least a portion of the object in the foreground depth image by computing registration parameters, the registration parameters being parameters of a transformation for aligning the foreground depth image and a preceding depth image;

integrating the foreground depth image into the volume by, for each voxel: using the position and orientation to determine a corresponding location in the depth image for the voxel, determining a factor relating to the distance between each voxel and the depth value at the corresponding location, and updating a stored value at the voxel using the factor; and rendering an image of the model in substantially real-time for display on a display device using ray-casting from the volume.

* * * * *